United States Patent
Nomura

(10) Patent No.: US 9,807,277 B2
(45) Date of Patent: Oct. 31, 2017

(54) IMAGE PROCESSING APPARATUS AND IMAGE PROCESSING METHOD

(71) Applicant: KONICA MINOLTA, INC., Chiyoda-ku, Tokyo (JP)

(72) Inventor: Shoichi Nomura, Machida (JP)

(73) Assignee: KONICA MINOLTA, INC., Chiyoda-Ku, Tokyo (JP)

(*) Notice: Subject to any disclaimer, the term of this patent is extended or adjusted under 35 U.S.C. 154(b) by 0 days.

(21) Appl. No.: 15/290,590

(22) Filed: Oct. 11, 2016

(65) Prior Publication Data
US 2017/0104888 A1    Apr. 13, 2017

(30) Foreign Application Priority Data
Oct. 13, 2015 (JP) ................. 2015-202339

(51) Int. Cl.
*G06F 15/00* (2006.01)
*H04N 1/387* (2006.01)
*H04N 1/00* (2006.01)

(52) U.S. Cl.
CPC ....... *H04N 1/3878* (2013.01); *H04N 1/00795* (2013.01); *H04N 1/00801* (2013.01); *H04N 1/00816* (2013.01); *H04N 2201/0005* (2013.01); *H04N 2201/0081* (2013.01); *H04N 2201/0082* (2013.01)

(58) Field of Classification Search
USPC ....................................... 358/1.18
See application file for complete search history.

(56) References Cited

U.S. PATENT DOCUMENTS

2013/0335759 A1* 12/2013 Hirose ............... G06K 15/1219
358/1.9

FOREIGN PATENT DOCUMENTS

JP    2000-244728 A    9/2000
JP    2006-082469 A    3/2006

* cited by examiner

*Primary Examiner* — Saeid Ebrahimi Dehkord
(74) *Attorney, Agent, or Firm* — Buchanan Ingersoll & Rooney PC

(57) ABSTRACT

An image processing apparatus includes: an image processing unit configured to execute image processing including skew correction that deforms an image so as to cancel distortion on the image; and a control unit configured to control the image processing on the image processing unit, wherein, in a case where a margin amount available for correcting the distortion is defined as a first correction margin amount and a margin amount used for correction other than skew correction is defined as a second correction margin amount, the control unit calculates a third correction margin amount obtained by subtracting the second correction margin amount from the first correction margin amount, and controls such that the image processing unit executes the image processing including the skew correction toward a first image and a second image such that the skew correction amount to be corrected falls within a range of the third correction margin amount.

16 Claims, 17 Drawing Sheets

IMAGE PROCESSING APPARATUS AND IMAGE PROCESSING METHOD

The entire disclosure of Japanese Patent Application No. 2015-202339 filed on Oct. 13, 2015 including description, claims, drawings, and abstract are incorporated herein by reference in its entirety.

BACKGROUND OF THE INVENTION

Field of the Invention

The present invention relates to an image processing apparatus and an image processing method, and particularly relates to a technique of appropriately correcting inclination of an image on a printed matter.

Description of the Related Art

In generating a printed matter by printing a text and an image (hereinafter, "image") on a sheet, there is a known technique of adjusting an image position to be printed on a proper position of the sheet.

Techniques to adjust the image position include a method of mechanically adjusting the positions of the sheet and a print head, and a method of adjusting the main scan print speed and the sub scan direction density by adjusting the sheet conveyance speed and the polygon mirror rotation speed.

In recent years, in addition to these methods, there is a technique used in some cases to adjust the image position and inclination by deforming image information before printing in a direction of canceling an image position shift and image distortion at printing. At double-sided printing, in a case where inclination (skew) exists on each of images on front/back of the sheet, this technique can typically execute position adjustment easily for each of the front/back by deforming the image so as to direct opposite directions.

Related techniques are described in the related arts such as JP 2006-82469 A and JP 2000-244728 A. Hereinafter, problems will be described together with JP 2006-82469 A and JP 2000-244728 A.

While the above-described image position adjustment involving image deformation (skew correction) is capable of highly flexible image position adjustment, it involves the following problems.

[Problem 1] Difficulty in Appropriately Setting Correction Target Position

Important factors for image position adjustment include position shift adjustment of front/back of the sheet (front/back registration).

In usual cases, position adjustment is executed so as to adjust a back surface to be fitted to a front surface on the assumption that the position adjustment has been applied for the front surface. In a case, however, where the front surface has not been printed at a desirable position, the printing position turns out to be undesirable in some cases even when the front/back registration is suitably fitted.

For example, there is an assumed case where the sheet having distortion is scheduled to be cut into a predetermined size after printing. In this case, the sheet is cut using a trim mark for cutting, namely, a predetermined cutting mark, as a guide. As a result, it is possible to obtain a printed matter having uniform image positions and the sheet size. However, in a case where the positional relationship between the print sheet before cutting and the trim mark for cutting is not properly maintained, particularly in a case where parallelism between the trim marks for initial cutting and the sheet side being abutted against a position adjustment tool at cutting is not properly maintained, a great amount of labor would be needed for post processing. In another case where cutting is not assumed, it would be preferable that adjustment is performed to achieve an image position that has no inclination in average toward each of the sides of the sheet, not a specific side.

While the above description assumes a case where there is distortion on an outer form of a sheet, this assumption applies not only to a case where a non-professional user creates an irregular-sized sheet by cutting a large-sized original sheet, but also to a case of various types of regular-sized sheets supplied from professionals. The reason is that even a cut sheet cut into a predetermined regular size by a professional machine usually includes a slight cutting error and a shift in right-angles at four corners, and that in some cases, storage condition after cutting would cause irregular expansion/shrinkage and this would decrease rectangularity at four corners.

JP 2006-82469 A describes a means for setting skew with respect to a predetermined end-side portion of the sheet, specifically, a configuration capable of adjusting the distortion appropriately by the user operation while viewing the image. In this, however, a correction target depends on experience and sensitivity on the user. Therefore, this technique cannot be easily utilized by workers having little experience in printing operation, except professionals.

[Problem 2] Necessity to Provide Margins in Image Print Region

The above-described technique of adjusting the image position and inclination by deforming image information can be achieved by obtaining a printable image region larger than a print image main body and then by performing deformation and position adjustment of the image within the region. The difference between the print image main body and the printable image region is referred to as a "margin".

While the maximum amount of adjustable image position depends on the size of the margin, enlarging the margin would be a factor of problems such as an increase in the cost of image forming apparatus, overall enlargement of the apparatus, and decrease in printing productivity. Therefore, enlarging the margin has its limit.

The above-described JP 2000-244728 A relates to document inclination correction processing at image reading. While printing in the present application and reading in JP 2000-244728 A differs n usage and objects, those have a common issue in that image deformation processing needs a margin and that size of the margin has a limitation. JP 2000-244728 A describes a technique of issuing an alert indication and modifying correction, or the like, when inclination of the document exceeds a maximum correction angle. There is, however, there is no suggestion of effectively using the limited margin.

[Problem 3] Possibility of Image Quality Deterioration in Skew Correction

Image position adjustment using image deformation involves processing of deforming a printed image, and thus, might involve image quality deterioration that is visually recognizable. In order to cope with this case where image quality deterioration is undesirable, it would be possible to prepare a switch to avoid executing skew position adjustment. In this case, however, simply selecting to avoid executing a skew correction amount alone might cause a shift of the image position with respect to the sheet in an unintended direction. In order to cope with this, it is necessary to provide countermeasures such as retrying image position adjustment and preliminarily executing individual adjustments with execute/not execute of skew position adjustment, causing lots of trouble.

SUMMARY OF THE INVENTION

The present invention has been made in view of this problem, and an object thereof is to achieve an image processing apparatus and an image processing method capable of appropriately executing necessary correction using margins effectively in a case where adjustment involving skew correction is performed corresponding to various types of distortion generated at image forming.

The image processing apparatus and the image processing method according to an aspect of the present invention made in order to solve the above-described problem will be described below.

(1) To achieve the abovementioned object, according to an aspect, an image processing apparatus reflecting one aspect of the present invention comprises: an image processing unit configured to execute image processing including skew correction that deforms an image so as to cancel distortion generated on the image formed on a sheet; and a control unit configured to control the image processing on the image processing unit, wherein, in a case where a margin amount available for correcting the distortion is defined as a first correction margin amount and a margin amount used for correction other than skew correction, among the distortion, is defined as a second correction margin amount, the control unit calculates a third correction margin amount obtained by subtracting the second correction margin amount from the first correction margin amount, and controls such that the image processing unit executes the image processing including the skew correction toward a first image formed on a first surface of the sheet and toward a second image formed on a second surface of the sheet such that the skew correction amount to be corrected by the skew correction falls within a range of the third correction margin amount.

(2) According to Item. 1, the image processing unit preferably executes the image processing including the skew correction so as to adjust the image to an intermediate position of the first image and the second image.

(3) According to Item. 1, in a case where it is selectable whether skew correction takes priority over items other than the skew correction and where skew correction priority is selected, the control unit preferably controls the image processing unit so as to execute the image processing including the skew correction by performing position adjustment for at least one of the first image and the second image such that the third margin amount is maximized.

(4) According to Item. 3, the control unit preferably allows a portion of a mark indicating a cutting position of the sheet to protrude from the sheet when the mark is generated.

(5) According to Item. 1, the control unit preferably calculates a skew correction amount to be corrected by the skew correction, and controls the image processing unit so as not to execute the skew correction in a case where the skew correction amount is smaller than a predetermined threshold.

(6) According to Item. 5, the control unit preferably calculates the skew correction amount separately for a main scan direction correction amount and a sub scan direction correction amount, at image forming, and controls the image processing unit so as not to execute the skew correction in a case where each of the main scan direction correction amount and the sub scan direction correction amount is smaller than a predetermined threshold.

(7) According to Item. 5, the control unit preferably calculates a skew correction amount to be corrected by the skew correction, and controls the image processing unit so as to execute the skew correction in a condition where the skew correction amount is smaller than a predetermined threshold and in a case where the selection was execution of the skew correction even when the condition is met.

(8) According to Item. 5, the control unit preferably calculates a skew correction amount to be corrected by the skew correction and controls the image processing unit so as not to execute the skew correction in a condition where the skew correction amount is smaller than a predetermined threshold and in a case where the selection is non-execution of the skew correction when the condition is met.

(9) To achieve the abovementioned object, according to an aspect, there is provided a non-transitory recording medium storing a computer readable program, reflecting one aspect of the present invention, used in an image processing apparatus including: an image processing unit configured to execute image processing including skew correction that deforms an image so as to cancel distortion generated on the image formed on a sheet; and a control unit configured to control the image processing on the image processing unit, wherein, in a case where a margin amount available for correcting the distortion is defined as a first correction margin amount and a margin amount used for correction other than for skew correction, among the distortion, is defined as a second correction margin amount, a third margin amount is calculated by subtracting the second correction margin amount from the first correction margin amount, and the image processing unit executes the image processing including the skew correction toward a first image formed on a first surface of the sheet and toward a second image formed on a second surface of the sheet such that the skew correction amount to be corrected by the skew correction falls within a range of the third correction margin amount.

(10) According to Item. 9, the image processing unit preferably executes the image processing including the skew correction so as to adjust the image to an intermediate position of the first image and the second image.

(11) According to Item. 9, in a case where it is selectable whether the skew correction takes priority over items other than the skew correction and where priority of skew correction is selected, the control unit preferably controls the image processing unit so as to execute the image processing including the skew correction by performing position adjustment for at least one of the first image and the second image such that the third margin amount is maximized.

(12) According to Item. 11, the control unit preferably allows a portion of a mark indicating a cutting position of the sheet to protrude from the sheet when the mark is generated.

(13) According to Item. 9, the control unit preferably calculates a skew correction amount to be corrected by the skew correction, and controls the image processing unit so as not to execute the skew correction in a case where the skew correction amount is smaller than a predetermined threshold.

(14) According to Item. 13, the control unit preferably calculates the skew correction amount separately for a main scan direction correction amount and a sub scan direction correction amount, at image forming, and controls the image processing unit so as not to execute the skew correction in a case where each of the main scan direction correction amount and the sub scan direction correction amount is smaller than a predetermined threshold.

(15) According to Item. 13, the control unit preferably calculates a skew correction amount to be corrected by the skew correction, and controls the image processing unit so as to execute the skew correction in a condition where the skew correction amount is smaller than a predetermined threshold and in a case where the selection is execution of the skew correction even when the condition is met.

(16) According to Item. 13, the control unit preferably calculates a skew correction amount to be corrected by the skew correction, and controls the image processing unit so as not to execute the skew correction in a condition where the skew correction amount is smaller than a predetermined threshold and in a case where selection is non-execution of the skew correction when the condition is met.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Hereinafter, embodiments of an image processing apparatus and an image processing method capable of executing appropriate skew correction in response to various types of distortion generated at image forming will be described in detail with reference to the drawings. However, the scope of the invention is not limited to the illustrated examples.

[Configuration of Image Processing Apparatus]

Figure 1:
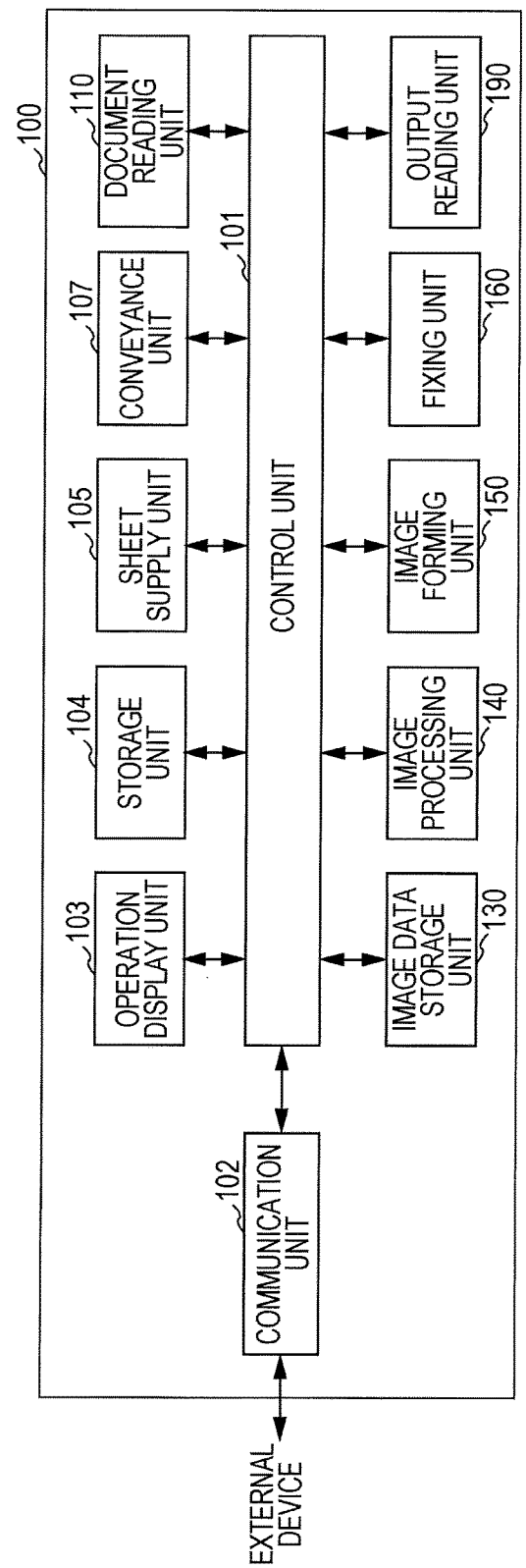
FIG. 1 is a diagram illustrating a configuration of an embodiment of the present invention.

An exemplary first configuration of the image forming apparatus will be described in detail with reference to FIGS. 1 and 2. FIG. 1 is a functional block diagram illustrating functions of individual portions and FIG. 2 is a diagram illustrating mechanical configuration elements for individual portions.

An image forming apparatus 100 includes a control unit 101, a communication unit 102, an operation display unit 103, a storage unit 104, a sheet supply unit 105, a conveyance unit 107, a document reading unit 110, an image data storage unit 130, an image processing unit 140, an image forming unit 150, a fixing unit 160, and an output reading unit 190. The control unit 101 controls individual units within the image forming apparatus 100. The communication unit 102 is provided for communicating with other connected apparatuses. The operation display unit 103 is provided for performing operation input by a user and state indication of the image forming apparatus 100. The storage unit 104 stores various types of settings. The sheet supply unit 105 is capable of supplying sheets stored in a sheet supply tray. The conveyance unit 107 conveys sheets within the apparatus. The document reading unit 110 reads the document. The image data storage unit 130 stores image data and various types of data at image forming. The image processing unit 140 executes various types of image processing needed for image forming. The image forming unit 150 forms an image on a sheet on the basis of an image forming command and image data. The fixing unit 160 fixes an image formed by toner on the sheet, using heat and pressure. The output reading unit 190 reads the image formed on the sheet.

Figure 2:
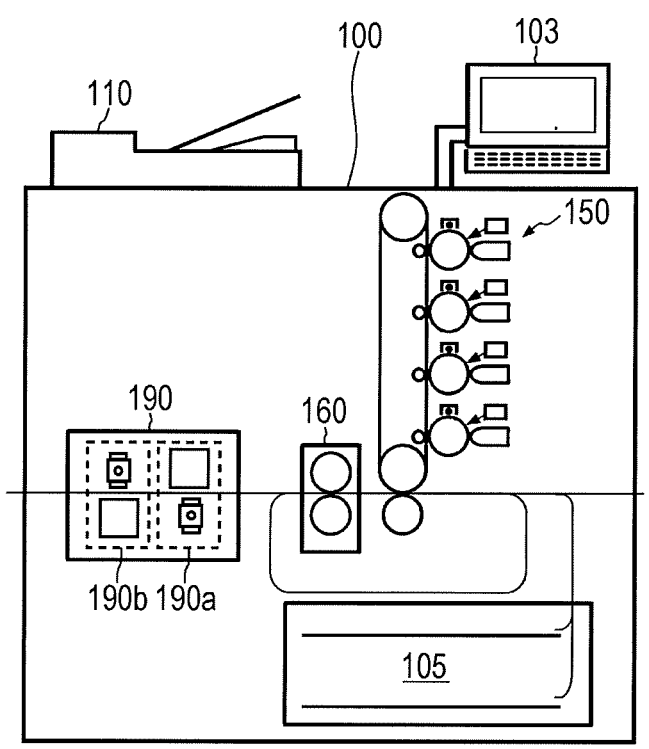
FIG. 2 is a diagram illustrating a configuration of an embodiment of the present invention.

The image forming unit 150 is an electrophotographic-type image forming unit that is configured, as illustrated in FIG. 2, such that an electrostatic latent image formed on a charged image bearing body is developed into a toner image, and toner images of individual colors are overlapped on an intermediate transfer body so as to be transferred onto a sheet. The specific configuration of the image forming unit 150 is not limited to the configuration illustrated in FIG. 2.

The output reading unit 190 is a unit for reading an image formed on a sheet and is arranged downstream of the image forming unit 150 and the fixing unit 160. The output reading unit 190 is configured to read the image during sheet conveyance. It is allowable to arrange the output reading unit 190 in an intermediate processing apparatus or a post processing apparatus, at a stage subsequent to the image forming apparatus 100. The output reading unit 190 includes an output reading unit 190a that reads an image on one surface of the sheet, and an output reading unit 190b that reads an image on another surface of the sheet.

On the image forming apparatus 100, it is also possible to configure the sections other than the image forming unit 150 and the fixing unit 160, as an image processing apparatus.

Figure 3:
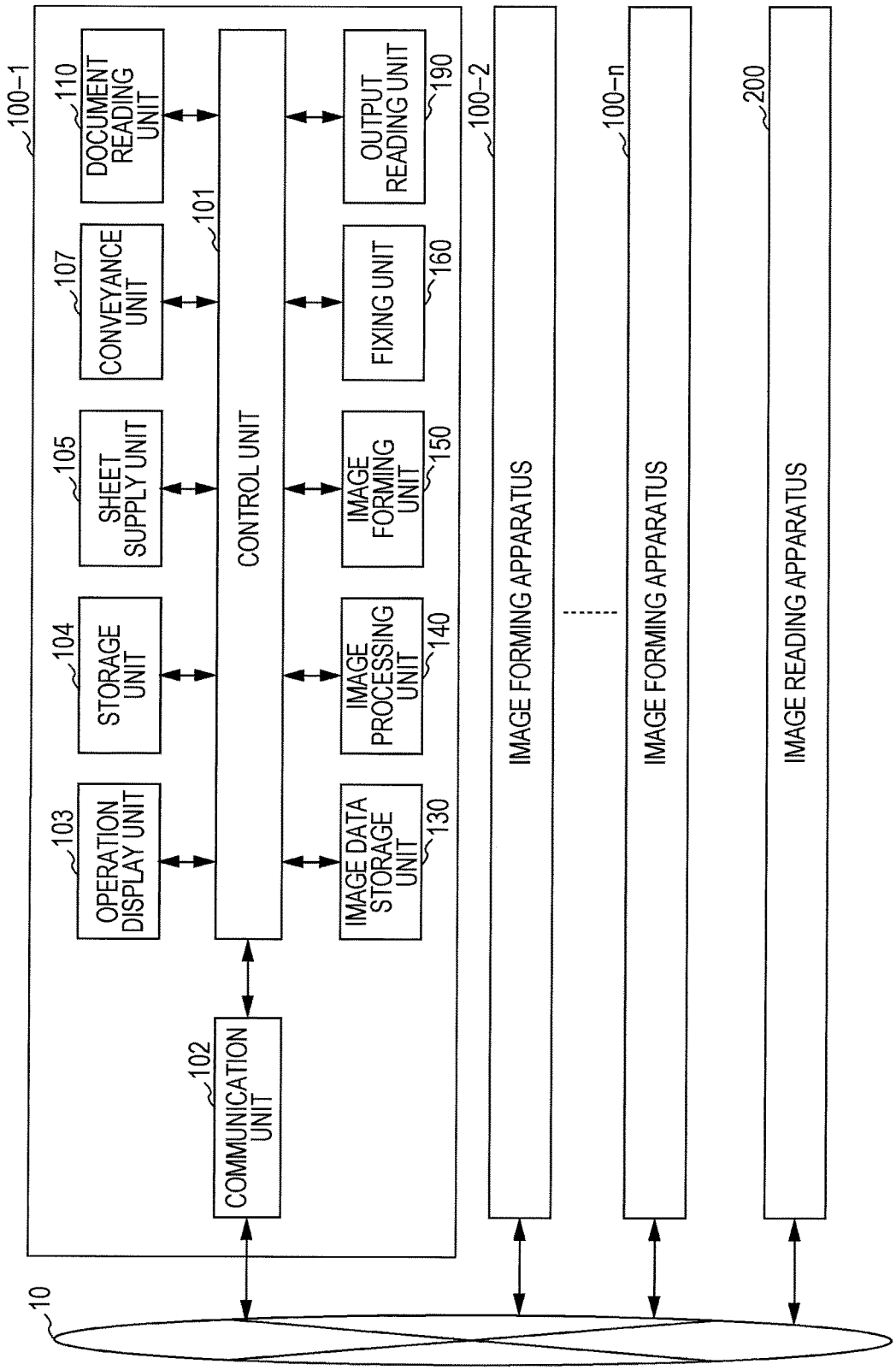
FIG. 3 is a diagram illustrating another configuration of an embodiment of the present invention.

FIG. 3 illustrates an exemplary second configuration of the image forming apparatus. In this example, the image forming apparatus 100-1 to the image forming apparatus 100-n, namely, a total of n image forming apparatuses are connected to a network 10. An image reading apparatus 200 is connected to the network 10. In this case, a scan result obtained by the image reading apparatus 200 is provided to the image forming apparatus 100-1 to the image forming apparatus 100-n via the network 10.

Figure 4:
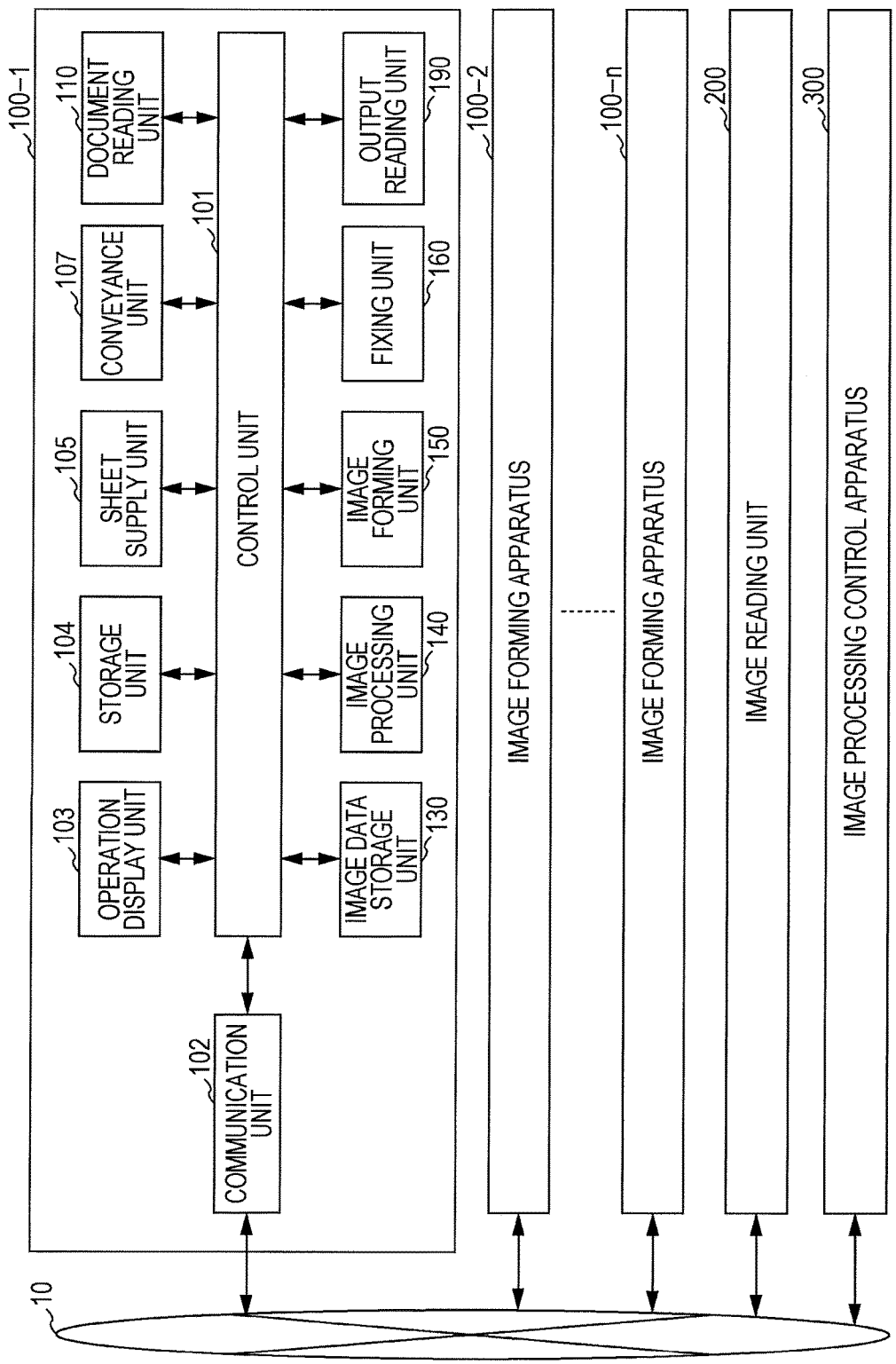
FIG. 4 is a diagram illustrating another configuration of an embodiment of the present invention.

FIG. 4 illustrates an exemplary third configuration of the image forming apparatus. In this example, the image forming apparatus 100-1 to the image forming apparatus 100-n, namely, a total of n image forming apparatuses are connected to a network 10. The image reading apparatus 200 and an image processing control apparatus 300 are connected to the network 10. In this case, an image processing parameter calculated by the image processing control apparatus 300 according to the scan result obtained by the image reading apparatus 200 is provided from the image processing control apparatus 300 to the image forming apparatus 100-1 to the image forming apparatus 100-n, via the network 10.

[Principle of Image Processing (1)]

Figure 5:
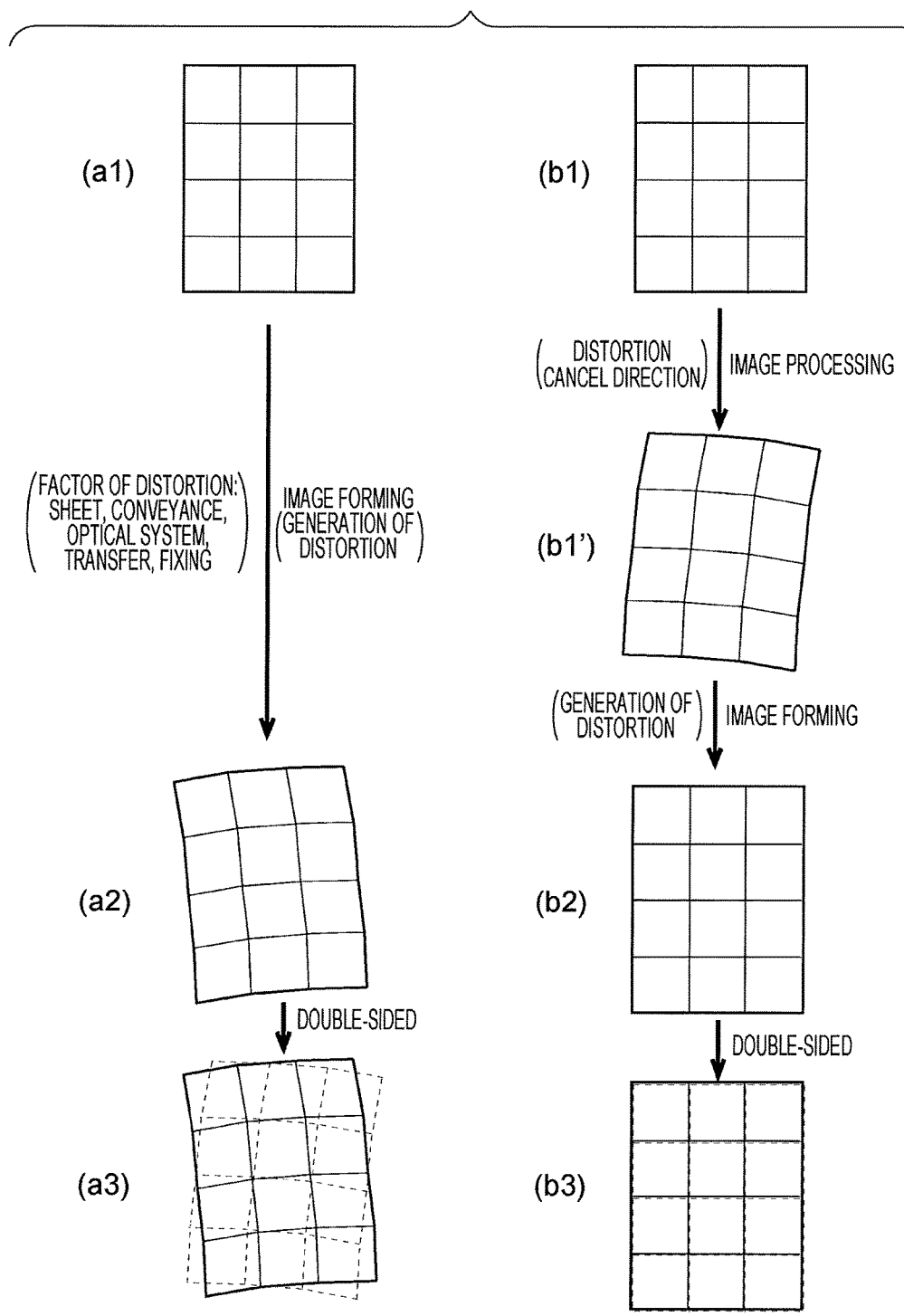
FIG. 5 is a diagram illustrating states of a printed matter of an embodiment of the present invention.

(a1) of FIG. 5 illustrates an image obtained in a case where the image is formed with no distortion, on the basis on image data. On the image forming apparatus 100, distortion is generated due to the shape of sheet, sheet conveyance characteristics, optical characteristics at image forming, image transfer characteristics from the image bearing body to the sheet on the image forming unit 150, image fixing characteristics on the sheet, or the like. As a result, an image having distortion, as illustrated in (a2) of FIG. 5, is formed. This example illustrates a case where inclination (skew) is generated as distortion. When the image having such distortion is formed on both sides of a sheet, the result would be as illustrated in (a3) of FIG. 5, in which a sheet front-surface image is indicated in a solid line and a sheet back-surface image is indicated in a broken line. In other words, when viewing through the sheet to compare the sheet front-surface image and the sheet back-surface image, the images have distortions in opposite directions.

FIG. 5 represents states in which a sheet is conveyed in the up-down direction of the diagram, a back-surface image is first printed, the sheet's front and back sides are flipped in a left-right inverted direction, and thereafter, the image is printed on the front surface with a same printing apparatus. This front-back relationship may change depending on printing methods, that is, front-back print execution methods such as a method of flipping the sheet in an up-down inverted direction, and a method of using two dedicated printing apparatuses for front and back surfaces, respectively. Even with this change, effects of the present invention would not be affected by the change.

Figure 6A:
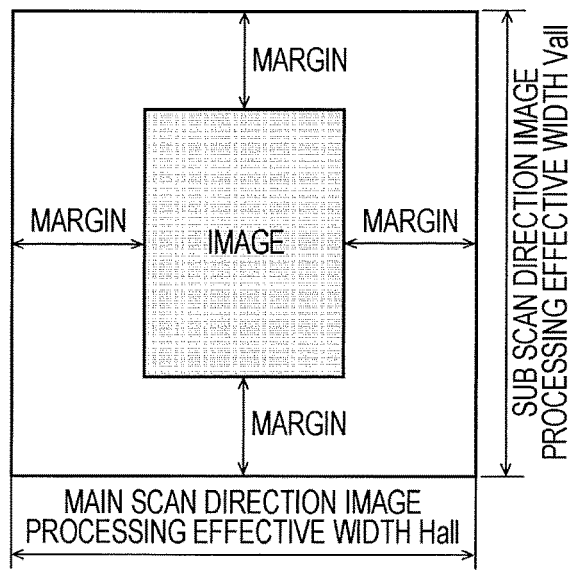
FIGS. 6A to 6C are diagrams illustrating states of image processing of an embodiment of the present invention.

In FIG. 5, distortion is indicated by complicated nonlinear distortion as illustrated in (a2) and (b1') of FIG. 5, and the amount of distortion itself is also exaggerated significantly. When using an actual printing machine, however, there is no situation where such a significant distortion as in the diagram is generated, and components of the nonlinear distortion, in many cases, are sufficiently small compared with the level of inclination, and thus, are not to be a correction target in image position adjustment. Therefore, FIG. 6A or subsequent diagrams illustrate various types of inclination components alone.

Although not illustrated, there may be a position shift of the image, due to distortion. Regarding the position shift of this image, the sheet front-surface image and the sheet back-surface image may have, for example, a position shift in an opposite direction, according to the combination of front-back printing method as described above, when viewed through the sheet.

(b1) of FIG. 5 represents an image obtained in a case where image is formed with no distortion on the basis of image data. On the image forming apparatus 100, distortion as illustrated in (a2) of FIG. 5 is generated due to the shape of sheet, sheet conveyance characteristics, optical characteristics at image forming, image transfer characteristics from the image bearing body to the sheet on the image forming unit 150, image fixing characteristics on the sheet, or the like. As illustrated in (b1') of FIG. 5, the image is deformed at a stage of image data before image forming, such that angles and directions become the opposite directions of the example in (a2) of FIG. 5. As a result, distortion generated in image forming is canceled and an original image with no distortion is formed as illustrated in (b2) of FIG. 5. When such an image having no distortion is formed on both sides of the sheet, the result would be as illustrated in (b3) of FIG. 5, with the sheet front-surface image being indicated in a solid line and sheet back-surface being indicated in a broken line. In other words, when viewing through the sheet to compare the sheet front-surface image and the sheet back-surface image, the images match each other.

Although not illustrated, in a case where an image position shift is generated by distortion, it is possible to handle this by correcting the position, at a stage of image data, in an opposite direction of the generated position shift.

[Principle of Image Processing (2)]

Within an image memory of the image processing unit 140, an image work space (main scan direction image processing effective width Hall×sub scan direction image processing effective width Vall) larger than the image to draw ("image" in FIG. 6A) is prepared beforehand, and the inclination and position are corrected within the space.

Figure 6B:
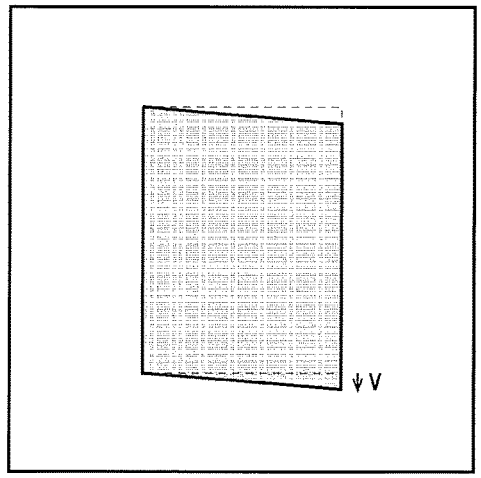
Figure 6C:
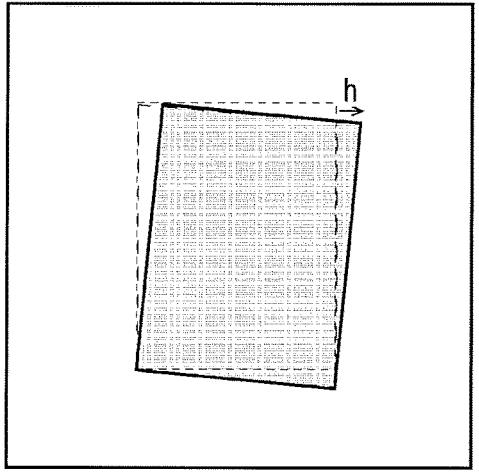

In inclining the image, inclination is executed sequentially such that pixel shift in a sub scan direction v as illustrated in FIG. 6B, and then, pixel shift in a main scan direction h as illustrated in FIG. 6C. In this manner, by individually controlling image skew deforming function for each of main and sub, it is possible to perform image deformation processing corresponding to image rotation, and thus, to reduce the burden at image processing performed by the image processing unit 140. Alternatively, processing can be performed in an order of the pixel shift in the main scan direction h as illustrated in FIG. 6C, and then, the pixel shift in the sub scan direction v as illustrated in FIG. 6B. It is also possible to process two components with one step instead of two steps as above.

In addition, in a case where adjustment amount for one direction of the main scan direction and the sub scan direction is extremely small, as described above, an effect of image position adjustment to be obtained by this adjustment would be small. Still, image deformation processing is executed, and this might lead to image quality deterioration in some cases. To cope with this, it is allowable to configure such that whether to "execute/not execute" fine position adjustment is selectable, and in a case where "not execute" is selected, a component corresponding to the fine position adjustment, or a corresponding step would not be executed so as to avoid image quality deterioration.

[Margin in Image Processing]

In order to execute image deformation processing at correcting inclination and position of the image, as described above, it is necessary to provide an allowance region (margin) needed to deform and move the image, around the image and within the image work space. This margin would be necessary both on the image memory used for image deformation processing and on the image bearing body on which the image is formed by exposure.

Figure 7:
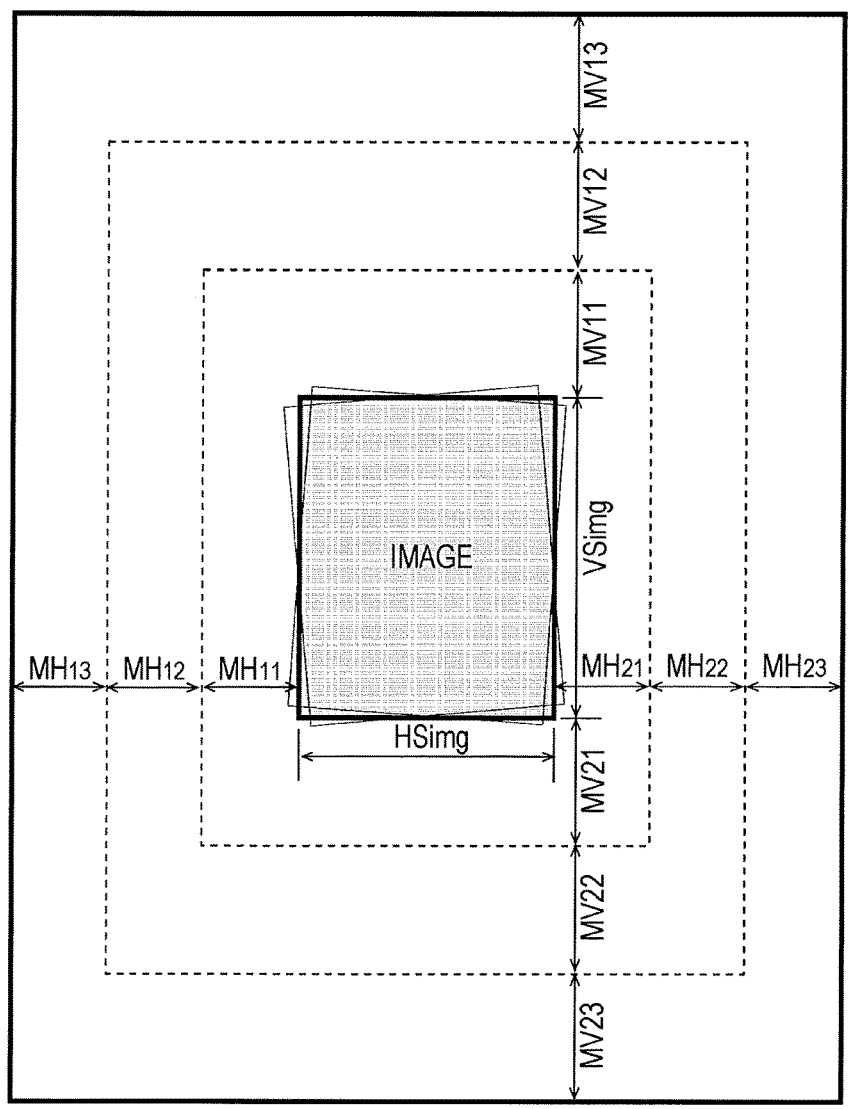
FIG. 7 is a diagram illustrating a state of image processing of an embodiment of the present invention.

The margin can be classified into skew correction margin (main scan direction: MH11 and MH21, sub scan direction: MV11 and MV21), magnification correction margin (main scan direction: MH12 and MH22, sub scan direction: MV12 and MV22), position correction margin (main scan direction: MH13 and MH23, sub scan direction: MV13 and MV23) (refer to FIG. 7).

In consideration of combining various types of adjustment amounts, the maximum value of the necessary margin amount is obtained by addition, or in a condition where individual adjustment amounts are independent and each of the changes in adjustment amounts (variation for each of individual items or for the number of execution times)

practically conforms to normal distribution, the value is statistically assumed to be a square root value of the sum of squares, namely, expanding. Meanwhile, in order to obtain a sufficient amount of margin, it is necessary, in case of the sub scan direction, for example, to expand a distance between the sheets in a sheet conveyance direction at consecutive printing, that is, necessary to suppress the number of prints per unit time so as to be small. In case of the main scan direction, it would be necessary to expand the whole widths of a fθ lens, a photosensitive drum, a fixing apparatus, or the like, corresponding to the main scan. As a result, these might significantly affect apparatus performance and printing cost.

On the other hand, in a case where these margins are not enough, performing sufficient correction would be difficult, leading to a possibility of generation of vignetting in the image and print quality deterioration.

The individual correction amounts, however, have variation in importance (priority) according to the usage on the user and distortion generation conditions. In outputting to a regular size sheet, the output itself is a final usage form, and thus, the image needs to be printed at a prescribed position on the sheet. In the case of outputting an elongated sheet with a trim mark (cutting mark), being assumed to be cut, it is necessary to provide print patterns (print pattern parallel to the sheet sides) that facilitates cutting.

Accordingly, the present embodiment provides a function to set a priority in various types of correction such as inclination skew correction and position correction of the position shift. In addition, a function is provided to allow high-priority correction to use the margin, and to reduce the amount of use of the margin for the other corrections so as to restrict the amount of correction to be small. These functions will be described in detail below.

[Exemplary Image and Chart to be Formed on Sheet]

Figure 8A:
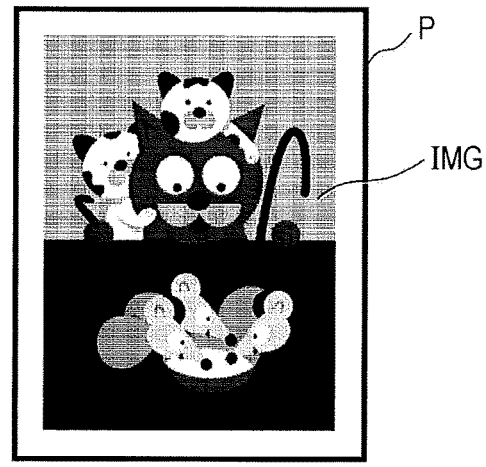
FIGS. 8A to 8C are diagrams illustrating states of a printed matter of an embodiment of the present invention.
Figure 8B:
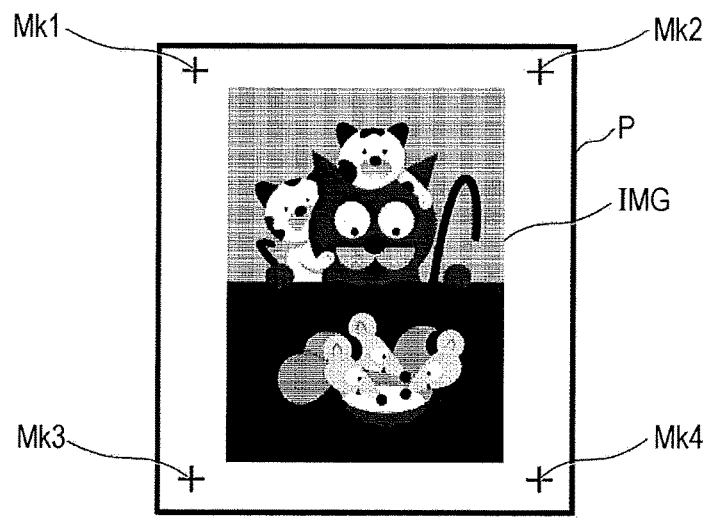
Figure 8C:
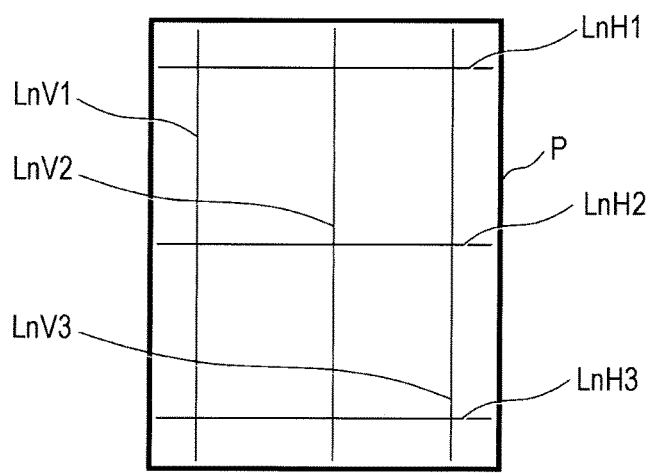

Hereinafter, output forms of printed matters will be described with reference to FIGS. 8A to 8C. FIG. 8A illustrates a state where an image IMG is printed on an overall sheet P and the sheet P is used as it is. In FIG. 8B, trim marks Mk1 to Mk4 as cutting marks are provided on peripheral portions of the sheet P, and the image IMG is printed inside the trim mark Mk1 to Mk4. After print, cutting is executed at positions of the trim marks Mk1 to Mk4 as post processing. As the trim marks Mk1 to Mk4 as cutting marks, not only cross-shaped but also other various types of shapes can be used. As illustrated in FIG. 8C, main scan direction measurement reference lines LnH1 to LnH3 and sub scan direction measurement reference lines LnV1 to LnV3 are printed and output as a chart on the overall sheet P. This chart is read by the document reading unit 110, the output reading unit 190, and the image reading apparatus 200, and distortion of the printed image is detected from a reading result. The measurement reference line is not intended to be limited to the specific examples illustrated herein but various types of modes of lines may be used.

The chart can either be read by the document reading unit 110 or be measured by user's visual inspection, in which case, the measurement result (mathematic value) can be input into the operation display unit 103. The chart will be described in detail below.

[Image Processing Operation]

Hereinafter, image processing operation on the image forming apparatus 100 in the present embodiment will be described in detail with reference to the flowchart in FIG. 9.

Figure 9:
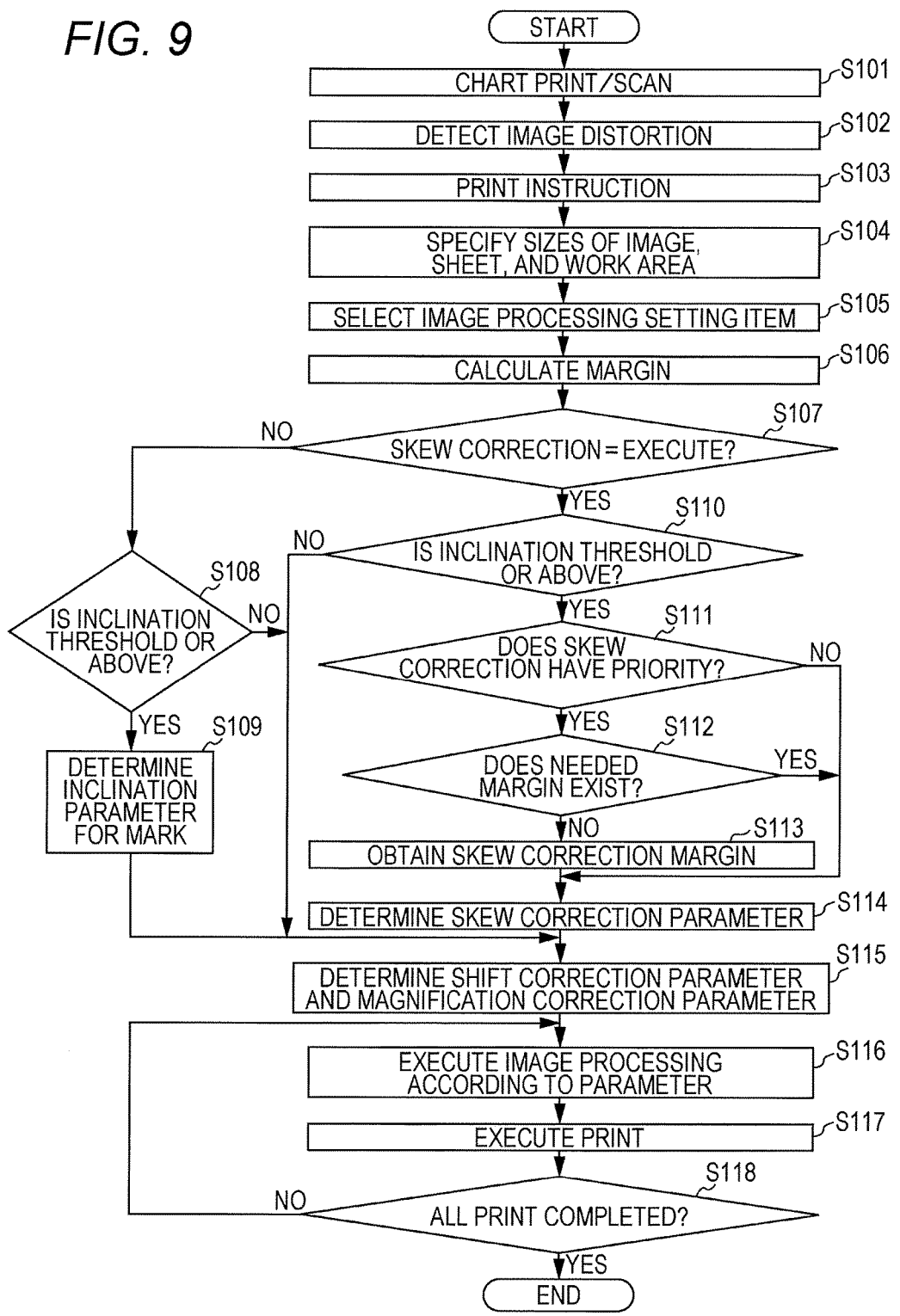
FIG. 9 is a flowchart illustrating operation of an embodiment of the present invention.

According to an instruction from the control unit 101, the image forming apparatus 100 prints a chart (refer to FIG. 8C) on a sheet and reads the chart printed on the sheet by the output reading unit 190 or the document reading unit 110 (step S101 in FIG. 9). Note that in a case where the chart is read by the output reading unit 190, the reading is automatically executed together with printing according to the instruction from the control unit 101. In another case where the chart is read by the document reading unit 110, an operator executes the reading according to the display on the operation display unit 103.

In this case, image information on end portions of a measurement sheet would be important, for example, and thus, it is desirable that, when the measurement sheet is placed on a platen, reading is executed in a state where a background member such as a black sheet is arranged as a background of the measurement sheet so as to allow an outline of the measurement sheet to be detectable in the black background. In a case where the sheet size including the above-described black background is not within the maximum reading size of the document reading unit 110, it would be allowable to configure such that partial reading of the measurement sheet is performed for a plurality of times in a predetermined procedure, and reading images are combined into one large image to be determined as a reading result.

After receiving an instruction from the control unit 101 on the basis of a chart reading result, the image processing unit 140 compares image data before printing with the chart reading result and detects distortion of the image generated on the printed matter (step S102 in FIG. 9). As described in (a2) of FIG. 5, this distortion is generated due to the shape of sheets, sheet conveyance characteristics, optical characteristics at image forming, image transfer characteristics from the image bearing body to the sheet on the image forming unit 150, image fixing characteristics on the sheet, or the like.

It is allowable to configure such that the above-obtained distortion of the image is calculated as a position shift amount from a reference position, for example, and this shift amount, or a correction amount obtained by inverting the value is displayed on the operation display unit 103 so as to be recognizable by the user. Alternatively, it is allowable to configure such that the shift amount and correction amount can be directly edited on the operation display unit 103 so as to enable additional correction by the user, and that processing on and after step S103 are executed on the basis of the directly edited value.

Note that the above-described chart print and reading (step S101 in FIG. 9) and distortion detection (step S102 in FIG. 9) may be executed at any timing of power on of the image forming apparatus 100, every fixed time period, at the start of printing, at a change of environmental conditions, at exchange of the sheets inside the sheet tray, or at the time set by the user.

The control unit 101 receives an instruction regarding an image to be print on the image forming apparatus 100, from the operation display unit 103 or an external computer (step S103 in FIG. 9). This instruction may involve image data input into the image forming apparatus 100 or may be a print instruction for the image data already stored in the image data storage unit 130. Together with the print instruction, print sheet size, sheet type, and the number of sheets to print are issued as instructions.

According to the print instruction, the control unit 101 specifies the image size, the sheet size, and the working area (image memory of the image data storage unit 130, and image bearing body of the image forming unit 150) size (step S104 in FIG. 9).

In addition, the control unit 101 receives image processing setting items from the operation display unit 103 or an external computer (step S105 in FIG. 9).

Here described is an exemplary image processing setting item screen 103G1 displayed on the operation display unit 103. As illustrated in (a) to (f) of FIG. 10 and in (a) to (f) of FIG. 11, image processing setting items and options include:

skew correction (execute/not execute);

trim mark position skew correction; (execute/not execute);

correction target (front fitting/specified side/sheet average/front-back average);

first target position (sheet head edge/sheet tail edge/sheet front edge/sheet rear edge)

second target position (sheet head edge/sheet tail edge/sheet front edge/sheet rear edge)

priority processing (skew correction priority/shift correction priority).

With these setting items, it is possible to set whether to execute skew correction, and what is going to be a correction target in a case where skew correction is to be executed. In addition, it is possible to set the trim mark position and whether to give priority to skew correction in a case where skew correction is not going to be executed.

Figure 10:
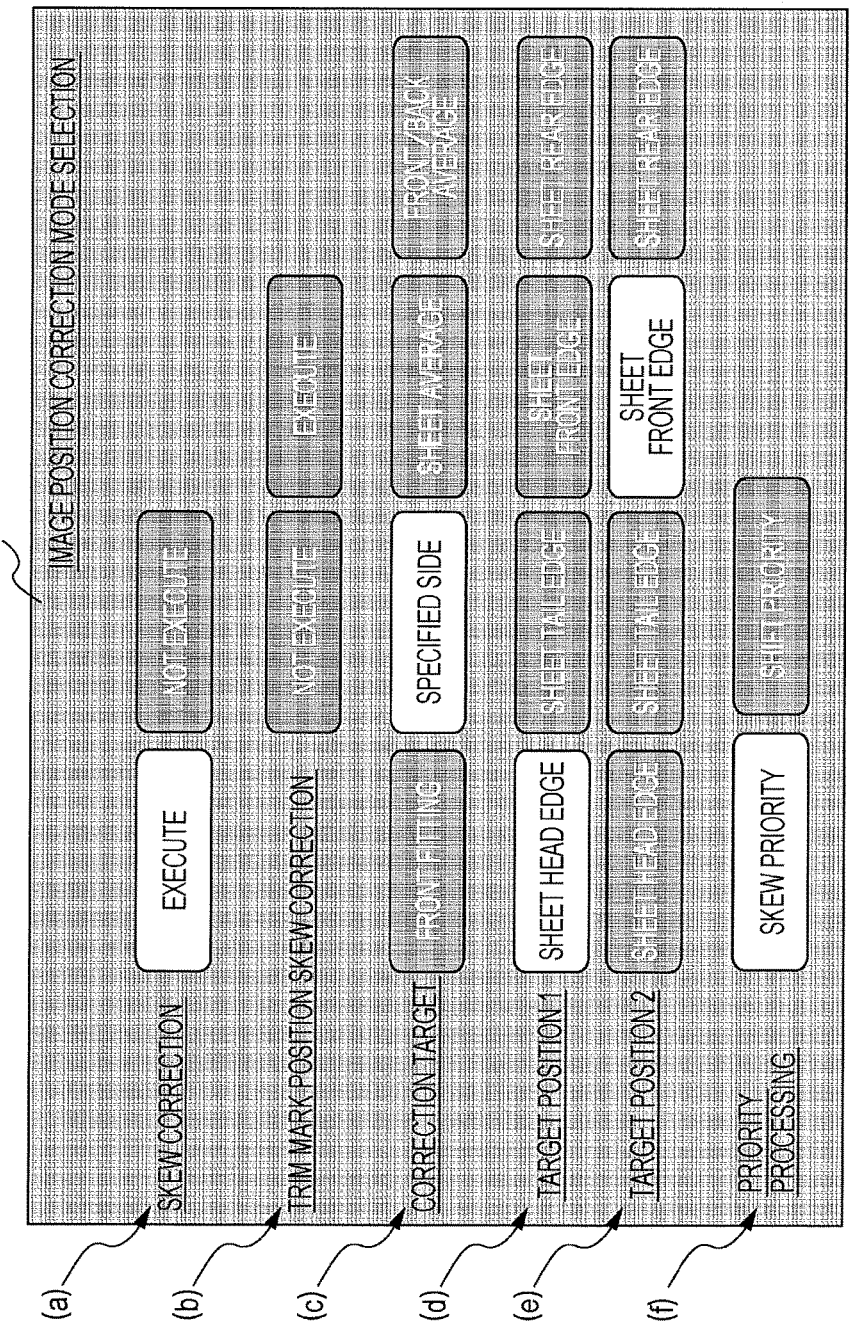
FIG. 10 is a diagram illustrating an operating state of an embodiment of the present invention.
Figure 11:
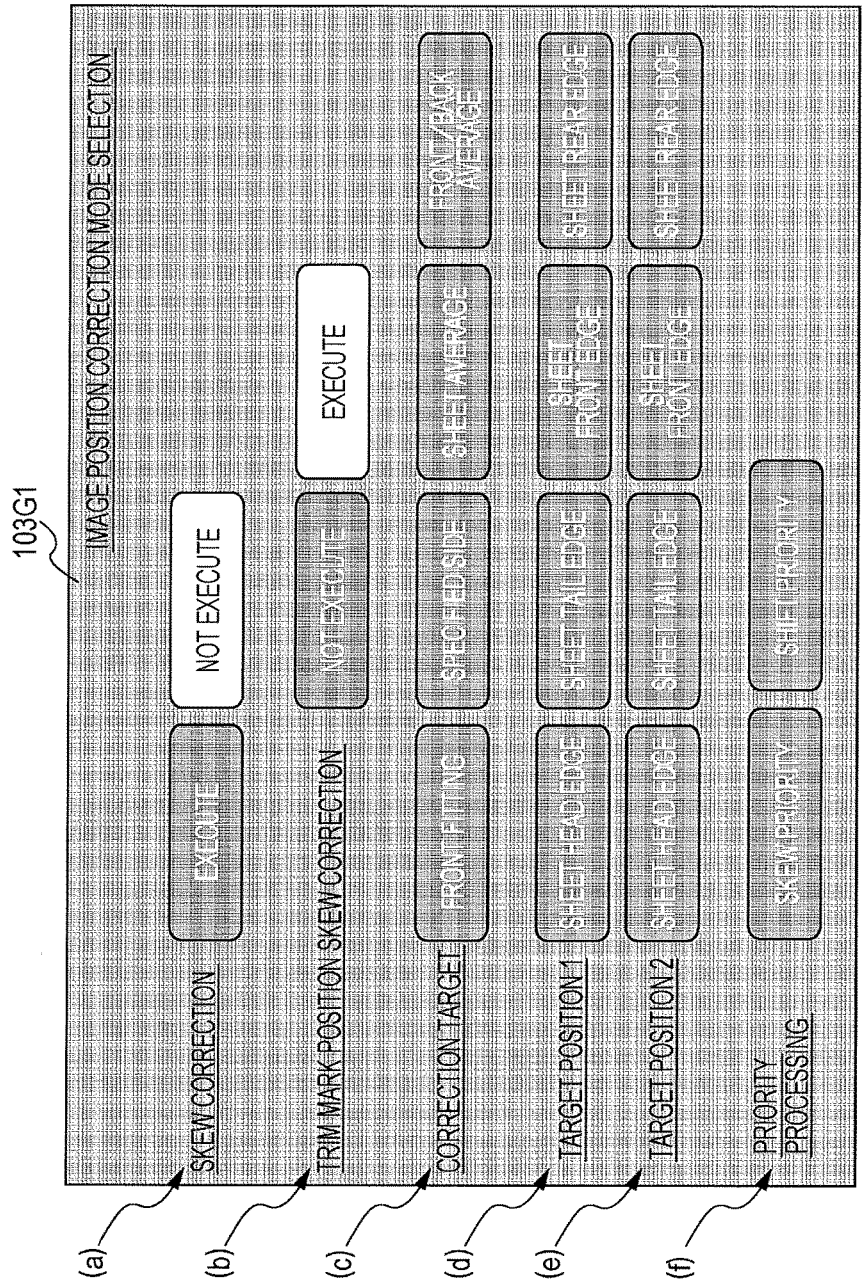
FIG. 11 is a diagram illustrating an operating state of an embodiment of the present invention.

In FIGS. 10 and 11, the selected button is highlighted to indicate black texts in white background, and thus, whether the button is selected can be easily recognized.

This selection is designed to be performed in the order from the top. For example, in a case skew correction is executed ((a) of FIG. 10), it is not necessary to select the trim mark position skew correction, and thus, overall options are indicated in hatched states, being disabled ((b) of FIG. 10).

The example of FIG. 10 indicates such that, image skew correction=execute, correction target=specified side, first target position=sheet head edge, second target position=sheet front edge, priority processing at shortage of correction margin=skew correction.

In the example of FIG. 11, setting is such that image skew correction=not execute, trim mark position skew correction=execute. This case is exemplary setting for preventing image quality deterioration by a method of not executing skew correction to the image itself, and of correcting an image skew shift by adjusting cutting position by inclining the trim mark position as the cutting mark around the image so as to obtain a more preferable image without performing image deformation. In (f) of FIG. 11, selection of priority processing is disabled for both skew and shift. Alternatively, it is allowable to configure such that any of the selections can be enabled in the setting as needed, for example, when a possibility of margin shortage is high.

Figure 12:
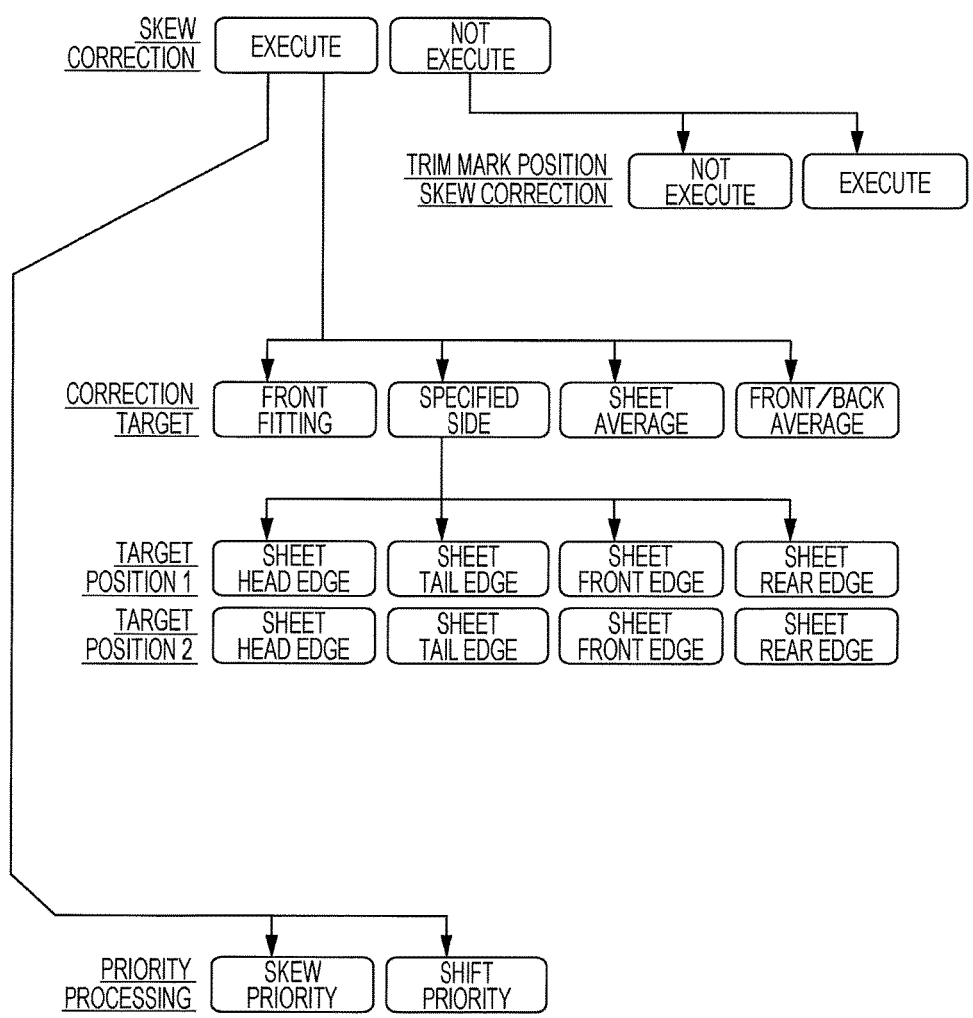
FIG. 12 is a diagram illustrating an operating state of an embodiment of the present invention.

While the above-described FIGS. 10 and 11 indicate exemplary image processing setting item screen 103G1, FIG. 12 is a dendrogram illustrating selecting order of the selection items.

The above-described image processing setting item selection is not limited to user settable configuration as illustrated in FIGS. 10 and 11. For example, it is allowable to configure such that the control unit 101 automatically selects correction mode on the basis of additional information such as trim mark attachment. In a case where it is determined that an outer form is not a proper rectangle on the basis of outer form measurement results of the print sheet, it is allowable to configure such that the control unit 101 automatically performs selection to set values to a predetermined setting value for the setting items on and after the correction target item on the correction mode at skew correction. Alternatively, it is also allowable to configure such that the control unit 101 provides an indication to prompt a user to select a correction mode at skew correction so as to be displayed on the operation display unit 103.

Furthermore, it is allowable to configure such that the control unit 101 can automatically switch selection items and allow the user to perform setting, according to the sheet size. For example, in a case where it is a regular A4 sheet, the sheet can usually be used as it is without cutting. In this case, the sheet average mode is used. In a case where it is an elongated A3 sheet, it usually assumes cutting, and thus, the specified side mode is selected. In this manner, it is allowable to configure such that presetting on the user is possible for each of the sheets. Alternatively, it is allowable to provide an "automatic" setting item whereby the user performs selection part of the way, and thereafter, the control unit 101 performs automatic determination.

Returning back to the flowchart in FIG. 9, description continues as below. With reference to the image size and the working area (machine-specific information of the image forming apparatus 100, such as image memory of the image data storage unit 130 and the image bearing body of the image forming unit 150) size, the control unit 101 calculates a skew correction margin, a magnification correction margin, and a position correction margin (step S106 in FIG. 9). Calculation of the skew correction margin, the magnification correction margin, and the position correction margin will be described in detail below.

The control unit 101 determines whether the above-set image processing setting item indicates skew correction=execute (step S107 in FIG. 9). When the setting is other than skew correction=execute (step S107: NO in FIG. 9), the control unit 101 determines whether image inclination is a predetermined threshold or above (step S108 in FIG. 9) with reference to the result of detection (step S102 in FIG. 9) of distortion of the image. The predetermined threshold is a value determined by a user or as a factory setting initial value, to indicate whether inclination of the image is significant.

In a usage that emphasizes on the print image quality such as text quality and color tone, it would be desirable that skew correction is not executed in a case where image inclination is small because executing skew correction might lead to more disadvantage of image quality deterioration than advantage of skew correction.

In label printing and layout printing mainly including ruled lines and texts, front-back positional accuracy has more importance than a slight image quality deterioration in most cases. In this case, it is allowable to configure such that the threshold can be set to a small value and the user can set the values.

Moreover, it is allowable to provide a skew threshold switch that can select enable/disable of the step (step S108 in FIG. 9) that determines whether the value is the predetermined threshold or above. For example, it is allowable to enable the skew threshold switch in usage situations where the print image quality such as text quality and color tones has importance, and to select not executing skew correction in a case where image inclination is small. It is allowable to disable the skew threshold switch in label printing and layout printing mainly including ruled lines and texts, and to select constantly executing skew correction regardless of a relationship between the skew correction and the threshold level.

Figure 13:
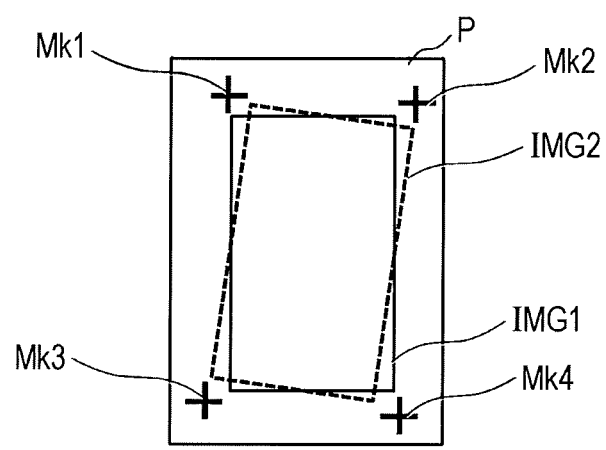
FIG. 13 is a diagram illustrating a state of a printed matter of an embodiment of the present invention.

When the setting is non-execution of skew correction (step S107 in FIG. 9: NO), and image inclination is a predetermined threshold or above (step S108 in FIG. 9: YES), a parameter to incline the trim marks Mk1 to Mk4 as cutting marks in accordance with the inclination of the images (first surface image IMG1 and second surface image IMG2) is determined (step S109 in FIG. 9) as illustrated in FIG. 13. In FIG. 13, the trim marks Mk1 to Mk4 are inclined to include the first surface image IMG1 and the second surface image IMG2.

The flowchart in FIG. 9 is designed to always incline the trim mark positions in a case where the above-described conditions are satisfied. Alternatively, as illustrated in FIGS. 10, 11, and 12, it is also allowable to configure such that the above-described trim mark position inclination processing can be executed when the setting is non-execution of skew correction and when execution of the trim mark position skew correction is selected.

Thereafter, processing moves on to shift correction parameter determination and magnification correction parameter determination (step S115 in FIG. 9).

Herein, when the setting is non-execution of skew correction (step S107: NO in FIG. 9), and when the image inclination is other than "the predetermined threshold or above" (step S108: NO in FIG. 9), processing moves on to shift correction parameter determination and magnification correction parameter determination (step S115 in FIG. 9).

When the setting is execution of skew correction (step S107: YES in FIG. 9), and when the image inclination is other than "the predetermined threshold or above" (step S110: NO in FIG. 9), processing moves on to shift correction parameter determination and magnification correction parameter determination (step S115 in FIG. 9) without determining skew correction parameters.

When the setting is execution of skew correction (step S107: YES in FIG. 9) and the image inclination is the predetermined threshold or above (step S110: YES in FIG. 9), and in a case where skew correction priority has not been set (step S111: NO in FIG. 9), skew correction parameter is determined within the range of skew correction margin (step S114 in FIG. 9), the shift correction parameter is determined within the range of the shift correction margin, and together with this, the magnification correction parameter is determined within the magnification correction margin (step S115 in FIG. 9).

When the setting is execution of skew correction step S107: YES in FIG. 9) and the image inclination is the predetermined threshold or above (step S110: YES in FIG. 9), and in a case where skew correction priority has been set (step S111: YES in FIG. 9), the procedure checks whether there is a skew correction margin needed to eliminate the image inclination by skew correction (step S112 in FIG. 9).

When the setting is execution of skew correction (step S107: YES in FIG. 9) and the image inclination is the predetermined threshold or above (step S110: YES in FIG. 9), and in a case where skew correction priority has been set (step S111: YES in FIG. 9) and when there is a skew correction margin needed to eliminate the image inclination by skew correction (step S112: YES in FIG. 9), skew correction parameter is determined within the range of skew correction margin (step S114 in FIG. 9), the shift correction parameter is determined within the range of the shift correction margin, and together with this, the magnification correction parameter is determined within the magnification correction margin (step S115 in FIG. 9).

When the setting is execution of skew correction (step S107: YES in FIG. 9) and the image inclination is the predetermined threshold or above (step S110: YES in FIG. 9), and in a case where skew correction priority has been set (step S111: YES in FIG. 9), when there is no skew correction margin needed to eliminate the image inclination by skew correction (step S112: NO in FIG. 9), margin adjustment is performed so as to obtain needed skew correction margin (step S113 in FIG. 9). Acquisition of the skew correction margin will be described in detail below. Subsequently, skew correction parameter is determined within the obtained skew correction margin (step S114 in FIG. 9), the shift correction parameter is determined within the shift correction margin, and together with this, the magnification correction parameter is determined within the magnification correction margin (step S115 in FIG. 9).

At a point where various types of image distortion correction parameters are determined, image processing for the image data is executed on the image processing unit 140 according to individual parameters (step S116 in FIG. 9), and print is executed on the image forming unit 150 on the basis of the image data that have undergone image processing (step S117 in FIG. 9).

With the above-described image processing and printing, the original image data ((b1) of FIG. 5) is deformed ((b1') of FIG. 5) by image processing so as to cancel distortion generated in image forming, and an original image without distortion is printed as illustrated in (b2) and (b3) of FIG. 5.

With control by the control unit 101, image processing and printing is executed on images on all pages, to which print instructions have been issued from the user (step S116 to S117, S118: YES and END, in FIG. 9).

The flowchart in FIG. 9 is applicable as it is in the case of single-sided printing. Even in the case of double-sided printing, it is also possible to execute processing with the flowchart in FIG. 9 by treating the front-back as a pair of images.

In this case, the chart output in step S101 is printed by double-sided printing, and thus, image distortion detected in step S102 is detected separately for each of front and back. In this case, it is understandably possible to detect the position shift of front and back from a difference of distortion on front and back. Calculation results can be used for front and back in common in step S103 to S106. It is also allowable to perform acquisition separately for front and back as needed. Note that step S107 and S111 are set for front and back in common. The configuration may be such that each of determinations in steps S108 and S110 is made separately for front and back and step S112 determines NO in a case where the margin for at least one of front and back is in shortage. In step S109, the mark is a trim mark for cutting. Accordingly, a parameter is generated solely on one surface (for example, front surface) and the parameter for the other surface (for example, back surface) is a parameter of not printing the mark. The margins in step S113 are provided for both front and back and various types of correction parameters in steps S114 and S115 are set individually for front and back. Subsequent steps S116 and S117 execute double-sided printing processing and step S118 determines completion of the whole print procedure.

The present flowchart illustrates exemplary output of the chart print one time and exemplary execution of ordinary print output using a correction value calculated on the basis of the measurement result. The present invention, however, is not limited to these examples. It is possible, for example, to design the flow such that chart print output is repeatedly executed in the flow on and after step S103, and that the output is brought back to scanning in step S101 so as to repeat correction. In this case, distortion obtained in step S102 (the above-described shift amount or correction amount) is to be added to the initial chart measurement and thereafter, processing on and after step S103 is executed.

[Detailed Description on Priority Processing (Skew Correction Priority/Shift Correction Priority)]

Exemplary operation in priority processing (skew correction priority/shift correction priority) will be described with reference to FIGS. 14A to 14C.

Figure 14A:
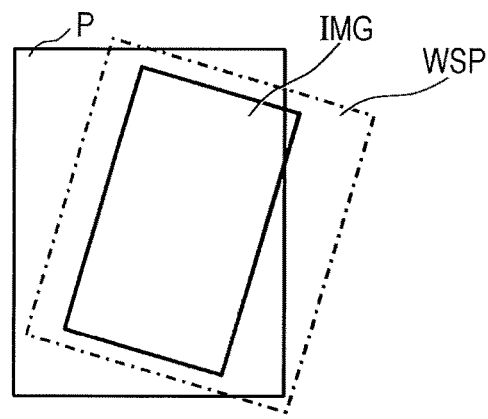
FIGS. 14A to 14C are diagrams illustrating states of a printed matter of an embodiment of the present invention.
Figure 14B:
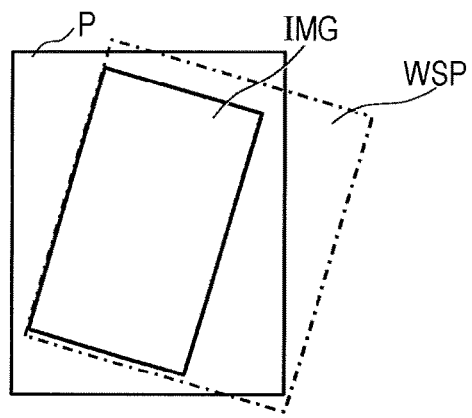
Figure 14C:
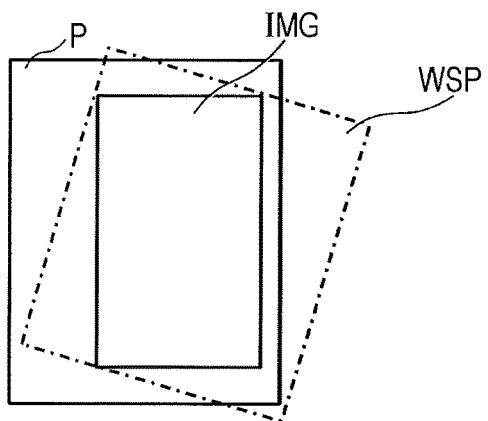

FIGS. 14A to 14C illustrate a relationship among the sheet P, an image work space WSP, and the image IMG.

FIG. 14A illustrates a state before correction, indicating the image IMG protruding from the sheet P due to distortion including inclination. Therefore, executing printing as it is would generate the image IMG that is partially lacking.

In order to cope with this, the image position is to be adjusted. In this adjustment, the range capable of image forming is within the region of the image work space WSP segmented by a one-dot chain line. Accordingly, when an attempt is made to adjust the image position to a proper position (no skew in the center) with respect to the sheet P, the image protrudes from the image work space WSP, causing generation of a partial lacking image.

FIG. 14B illustrates a state after correction with shift correction priority, a state where the image IMG is within the range of the sheet P due to shift correction. In this, however, since the shift correction causes the image IMG to be positioned at an edge portion of the image work space WSP, it is not possible to align the direction of the image IMG to the sheet direction by skew correction.

FIG. 14C illustrates a state after correction with skew correction priority, in which skew correction is executed while skew correction margin is obtained. With this procedure, the image IMG is aligned with the direction of the sheet P. In this, however, the margin is allocated with skew correction priority, and thus, the image IMG is positioned at the edge portion of the image work space WSP. Accordingly, it is not possible to align the image IMG position to the center of the sheet by shift correction.

[Detailed Description on Relationship Between Skew Correction and Correction Target]

The relationship between skew correction and correction target will be described in detail with a specific example, with reference to FIGS. 15A to 15F. The correction targets described in image processing setting item in FIG. 10 include options such as front fitting /specified side/sheet average/front-back average.

Figure 15A:
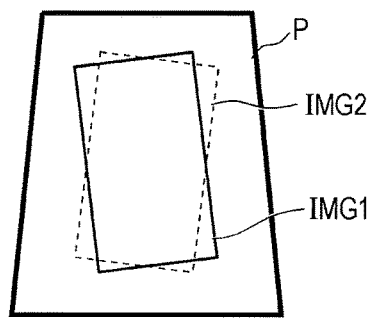
FIGS. 15A to 15F are diagrams illustrating states of a printed matter of an embodiment of the present invention.

FIG. 15A illustrates a state before correction of the first surface image IMG1 and the second surface image IMG2, on the sheet P.

Figure 15B:
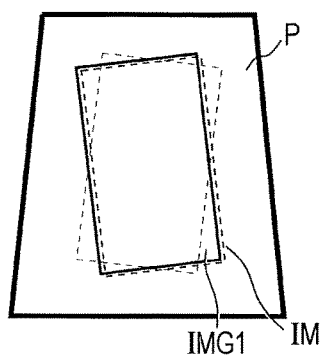

FIG. 15B illustrates a state, after skew correction, of the first surface image IMG1 and the second surface image IMG2 on the sheet P in a case front fitting is selected as a correction target of skew correction. Note that front fitting is a known technique. In this case, the second surface image IMG2 is fitted to the first surface image IMG1 on the assumption that the first surface image IMG1 is in a proper state. This case, however, turns out to be an undesirable result because print is executed regardless of the outer form of the sheet.

For example, there might be a case where the image position on the front surface has been properly measured and adjusted using a sheet with a proper outer form of the sheet (with proper size and proper rectangular shape) and thereafter, actual print work has been performed with a sheet with an error in the outer form of the sheet, and a front-back position shift has been generated. To cope with this, in a case where front-back position adjustment according to the present embodiment is executed, an image position shift due to the outer form of the sheet is generated on the front surface. In this case, it is obvious that position adjustment to adjust the back surface to be fitted to the front surface cannot achieve image position adjustment with respect to the sheet while it is successful in matching front-back positional relationship.

Figure 15C:
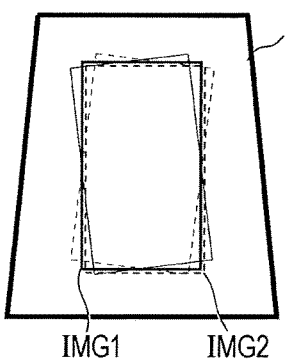

FIG. 15C illustrates a state, after skew correction, of the first surface image IMG1 and the second surface image IMG2 on the sheet P in a case front-back average is selected as a correction target of skew correction. In this case, the first surface image IMG1 and the second surface image IMG2 are adjusted to an intermediate inclination state between the first surface image IMG1 and the second surface image IMG2. This method has an advantage that merely a small skew correction margin would be needed in the first and second surfaces.

Figure 15D:
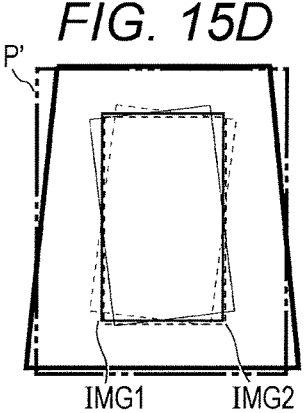

FIG. 15D illustrates a state, after skew correction, of the first surface image IMG1 and the second surface image IMG2 on the sheet P in a case where sheet average is selected as a correction target of skew correction. Although the outer form of the sheet P is not rectangular, the outer form is assumed to be rectangular, and with this assumption, the first surface image IMG1 and the second surface image IMG2 are adjusted with each other to be at the center of the assumed outer form. This arrangement is capable of optimizing adjustment of the image position within the outer form of the sheet and thus achieving a preferable print result in printing, such as in FIG. 8A, that does not assume cutting.

Figure 15E:
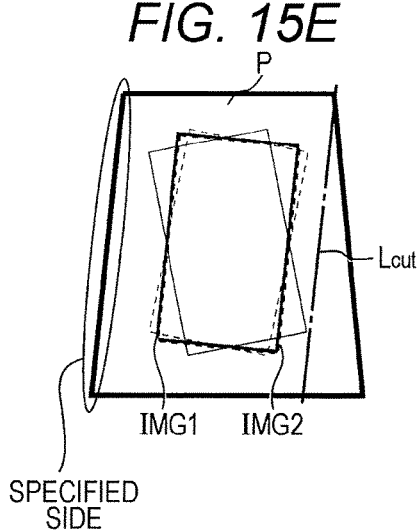

FIG. 15E illustrates a state, after skew correction, of the first surface image IMG1 and the second surface image IMG2 on the sheet P in a case where a specified side is selected as a correction target of skew correction. In this case, the first surface image IMG1 and the second surface image IMG2 are adjusted to each other such that the first surface image IMG1 and the second surface image IMG2 have minimum inclination with respect to a specified side and that the front-back positional relationship matches with each other. Accordingly, by defining the position opposing the specified side as a cutting position Lcut, it is possible to place the image properly within the sheet with easy operation. The specified side corresponds to a reference position related to skew correction.

Figure 15F:
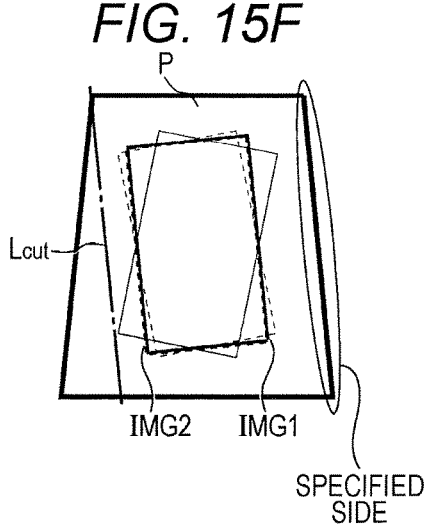

FIG. 15F illustrates a state, after skew correction, of the first surface image IMG1 and the second surface image IMG2 on the sheet P in a case where the specified side is selected as a correction target of skew correction. In this case, the first surface image IMG1 and the second surface image IMG2 are adjusted to each other such that the first surface image IMG1 and the second surface image IMG2 have minimum inclination with respect to a specified side (reference position) other than the side of FIG. 15E and that the front-back positional relationship matches with each other. Accordingly, by defining the position opposing the specified side as a cutting position Lcut, it is possible to place the image properly within the sheet with easy operation.

In this manner, using methods in FIG. 15E and FIG. 15F, it is possible to properly adjust the image inclination with respect to the specified side of the sheet. Accordingly, in a case where the sheet is cut after print, by setting a reference side at cutting as the reference side, it is possible to facilitate adjusting the image position after cutting, without skew. For example, in a case where post processing includes processing of binding the sheets of document with a staple, the bound side and the image position inclination are properly corrected with each other. Accordingly, it is possible enhance quality of the bound printed matter, and to enhance operability when cutting the bound document at post processing.

[Detailed Description on Margin Calculation]

Hereinafter, margin calculation by the control unit 101 will be described with specific values. This calculation of margin is performed with a same processing procedure, for each of the main scan direction and the sub scan direction. Accordingly, hereinafter, the main scan direction/sub scan direction will not be distinguished.

The sheet size Size_Paper is obtained on the basis of a print instruction. For example, the sheet size of the short-side of a A3 size sheet is 297 mm.

The image size Size_Image is calculated on the basis of the print instruction. For example, in the case of providing a white border edge of 3 mm at peripherals of A3 size sheet, the image size for the short-side of the A3 size sheet would be 297−(3*2)=291 mm. In printing on the whole surface of the sheet without any border edge, the image size Size_Image would be 297 mm, same as the sheet size.

With reference to apparatus specific information of the image forming apparatus 100, a maximum printable size Size_Print corresponding to a maximum working area is obtained. This value is determined by restrictions of the image forming apparatus 100. For example, the maximum printable size Size_Print according to the short sides of the above-described sheet and image in the main scan direction would be 310 mm.

With reference to apparatus-specific information on the image forming apparatus 100, a position correction margin Margin_Shift is obtained. This value is set as a margin capable of accommodating a shift of the sheet position from an original design center, generated by the way in which the sheet is stored in a sheet tray or a manufacturing error at assembly of the image forming apparatus 100. When position adjustment with the maximum value of ±5 mm is needed, the value would be set as 5*2=10 mm.

With reference to apparatus specific information on the image forming apparatus 100, a magnification correction margin Mergin_Mag is obtained. This value is a margin for correcting, for example, expansion/shrinkage of the sheet at printing and a fine magnification deviation of the image forming apparatus 100 itself. For example, in a case where it is necessary to expand/shrink the image in a maximum range of ±2.0%, since magnification correction margin is needed merely in the expanding direction, consideration is given merely to +2.0% direction. Accordingly, in the above-described case of the short side of A3 size sheet, 297*0.02=5.94 mm would be the necessary magnification correction margin.

Subsequently, the skew correction margin Mergin_Skew is calculated from the above.

To put it simply, Mergin_Skew=Size_Print−Size_Image−(Mergin_Shift+Mergin_Mag) can be applied. Accordingly, in the above-described example, the skew correction margin Mergin_Skew applicable to skew correction would be Mergin_Skew=310−291−(10+5.94)=3.06 mm.

In the above-described calculation, the margin is the amount of margin capable of correction even when the individual adjustment amount is maximized in the direction of consuming each of the margins. In actual cases, however, correction amounts are considered to be independent from each other, having substantially no mutual interaction, and thus, the possibility of generating such combination would be very low.

In a case, in this situation, where distribution of actual individual correction amounts are considered to be in accordance with a normal distribution, it is possible to obtain individual maximum margins such that the sum of squares of individual maximum margin amounts satisfies the range Mergin_All=Size_Print−Size_Image=310−291=19 mm, where Mergin_All is the total margin applicable to correction.

For example, in the above-described example, 10*10+5.95*5.95+(Mergin_Skew*Mergin_Skew)≤19*19. Accordingly, it is possible to use Mergin_Skew=SQRT(19*19−(10*10+5.95*5.95))=15.02 mm.

Desired correction is executable when the necessary maximum amount of skew correction amount is within the above-described range. In a case where the value exceeds this range, it is possible to limit the correction amounts for the image position and magnification when skew priority is selected, and it is possible to limit the skew correction amount when the shift priority is selected.

Alternatively, by setting the correction target to "front-back average", it is possible to effectively use the correction margin. In the above-described example, the margin amount is set according to the estimated maximum correction amount without any previous measurement. Alternatively, it is also allowable to check whether necessary margin is obtained at each measurement on the basis of a measurement result.

In this case, each of Mergin_Skew, Mergin_Shift, and Mergin_Mag is a measurement value. When a simple addition result of these values is within the total margin range Mergin_All, desired correction is possible. When it is not within the range, it is possible to limit the correction amounts for the image position and magnification when skew priority is selected, and it is possible to limit the skew correction amount when the shift correction priority is selected. Alternatively, by setting the correction target to "front-back average", it is possible to effectively use the correction margin.

[Detailed Description on Chart Reading]

Figure 16A:
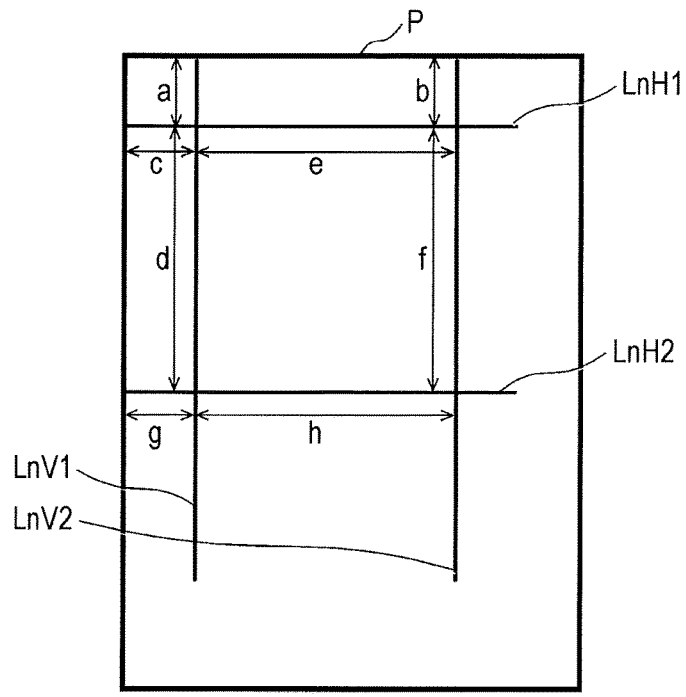
FIGS. 16A and 16B are diagrams illustrating states of a printed matter of an embodiment of the present invention.
Figure 16B:
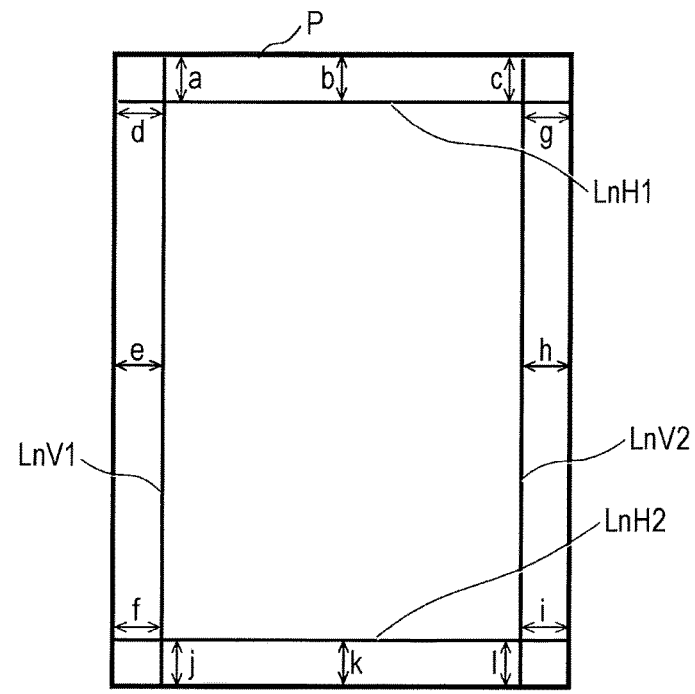

Measurement of front-back position shift of the double-sided printed matter is executed by printing a chart illustrated in FIGS. 16A and 16B.

First, position shift measurement of a first surface (front surface) of the sheet is executed with a chart on which measurement reference lines LnH1, LnH2, LnV1, and LnV2 are printed on the first surface (front surface) of the sheet P, as illustrated in FIG. 16A. This chart is solely printed on the first surface (front surface) of the sheet, capable of measuring the position shift at front surface printing. Measurement positions include an interval between the sheet edge portion and the measurement reference line, and intervals between a plurality of measurement reference lines, indicated by arrows a to h. The measurement positions may be measured using the document reading unit 110, or the like, or a measurement result value may be visually measured by a user with a scale, or the like, and input into the operation display unit 103. Printing and measurement of the chart is used to measure fundamental characteristics of the print, such as vertical/horizontal magnification ratio at printing, image center position, orthogonality of the sheet conveyance direction and the main scan direction, conveyance shift of the reference sheet (position and inclination of the sheet with respect to the conveyance direction).

Front-back position adjustment is executed using the chart illustrated in FIG. 16B. This pattern includes the measurement reference lines LnH1, LnH2, LnV1, and LnV2 printed on both of front and back surfaces of the sheet P. It is designed such that in a case where the measurement reference lines LnHl, LnH2, LnV1, and LnV2 have been properly (without distortion) printed on both front and back surfaces of the sheet P, the print positions for the measurement reference lines on front and back surfaces of the sheet P overlap with each other. In the chart in FIG. 16B, locations of arrows a to i, that is, distances between the measurement reference lines and the sheet edge portions are measured. Difference in measurement values of the locations having corresponding relationship between the front and back would be a position shift for the front and back.

The measurement may be performed using the document reading unit 110, or the like, or a measurement result value may be visually measured by a user with a scale, or the like, and input into the operation display unit 103.

Intersections of the measurement reference lines exist near four corners of the sheet P. Image inclination is obtained from the front-back difference of the position of this intersection.

Specifically, the size and position of the back surface image with respect to the front surface can be measured from the measurement of the four locations of arrow b, arrow e, arrow k, and arrow h in FIG. 16B. Inclination of the image can be obtained from the measurement corresponding to the eight locations of arrow a, arrow d, arrow f, arrow j, arrow l, arrow i, arrow g, and arrow c.

On the basis of this measurement result, the size and the position of the back surface image with respect to the front surface is calculated for each of the main scan direction and the sub scan direction, and then, the magnification correction parameter and a position adjustment parameter are calculated for each of these direction. The magnification correction parameter and the position adjustment parameter are adjustment values at the back surface printing.

Furthermore, on the basis of the measurement result of FIG. 16B, inclination of the back surface image with respect to the front surface is measured, and then, the skew correction parameter is calculated (in a case where correction in FIGS. 15B and 15C are executed). Alternatively, inclination between the measurement reference line for each of front/back and each of corresponding sheet sides in the same direction is measured, and then, a skew correction parameter is calculated (in a case where corrections of FIGS. 15D, 15E, and 15F are executed). This skew correction parameter is used to adjust inclination.

In a case where inclination is adjusted, the image is inclined around its fulcrum position (location where image position does not change by adjustment). This means that the image position is shifted from the position before correction, on the location other than the fulcrum position. In addition, the image position after skew correction differs depending on where the fulcrum position is placed. For example, in a case where skew adjustment setting is changed from "execute" to "not execute" as needed, position adjustment needs to be performed again at non-execution of the skew correction so as to maintain the skew correction fulcrum position at execution of the skew correction. Similarly, it is also necessary to perform position adjustment again in a case where setting is changed from "not execute" to "execute".

Accordingly, it is desirable that the skew correction fulcrum position corresponds to the measurement position in the position adjustment. With this state, even in a case where, for example, skew adjustment setting is changed between "not execute" and "execute" as needed, it is possible to maintain a preferable image position without changing the above-described magnification correction parameter and the position adjustment parameter.

For example, in a case where the above-described four locations indicated by arrow b, arrow e, arrow k, and arrow h, in FIG. 16B, are measured, each of the positions corresponds to the measurement position in position adjustment.

In a case where the above-described locations indicated by arrows a to h, in FIG. 16A, are measured, this means the position of LnH1 in the up-down direction is measured on the basis of an average value of measurement results for a and b, and the measurement position in position adjustment in that case corresponds to average position of a and b, namely, a location corresponds to a middle point on a line segment indicated by arrow e. Similarly, a middle point of each of a line segment indicated by arrow d, a line segment indicated by arrow h, and a line segment indicated by arrow f, corresponds to the measurement position in position adjustment.

For example, in comparing the case in FIG. 16B where four locations of arrow b, arrow e, arrow k, and arrow h are measured for position adjustment with the case, as described above, in which the locations indicated with arrows a to h in FIG. 16A are measured, the measurement positions in position adjustment differ from each other. Accordingly, in a case where skew adjustment is executed in FIG. 16B, there is a possibility of generation of a shift in the measurement position. In this case, it is possible to match the skew correction fulcrum position with the measurement position in position adjustment by allowing the positions to match the four positions of arrow b, arrow e, arrow k, and arrow h, in FIG. 16B by changing, for example, the chart design in FIG. 16A. Alternatively, it is possible to do this by matching the measurement position in position measurement with the case in the above-described FIG. 16A by obtaining, with interpolation, the measurement values corresponding to the locations indicated by arrows a to h from the measurement values corresponding to the eight locations of arrow a, arrow d, arrow f, arrow j, arrow l, arrow i, arrow g, and arrow c, at performing position adjustment illustrated in FIG. 16B.

In a case where it is difficult to match the skew correction fulcrum position with the measurement position in position adjustment for a certain reason, it is desirable to configure such that a case in which setting is changed from "execute" to "not execute" for skew adjustment is detected and the mode is automatically moved to an adjustment mode of re-executing image position adjustment, or such that a message is displayed to prompt a user to perform re-adjustment.

In this manner, in a case where each of the magnification correction parameter, the position adjustment parameter, and the skew correction parameter is calculated and applied, when the skew correction parameter turns off for a certain reason, the image is skewed around the above-described fulcrum position. In this case, by suppressing a shift of the image average position from the center of the sheet, it is possible to easily turn on/off the skew correction parameter by the user. Specifically, it is possible to easily turn off skew correction on an image mainly including, for example, flat half-tone, or uniform texture, on which image quality deterioration due to skew correction would be a concern, leading to enhanced convenience. As understandable from the above description, regarding the inclination amount, not only the adjustment amount on the print back surface but also adjustment amount on the front surface changes according to the mode.

[Detailed Description of Cutting Mark and Cutting Position Identification]

Figure 17A:
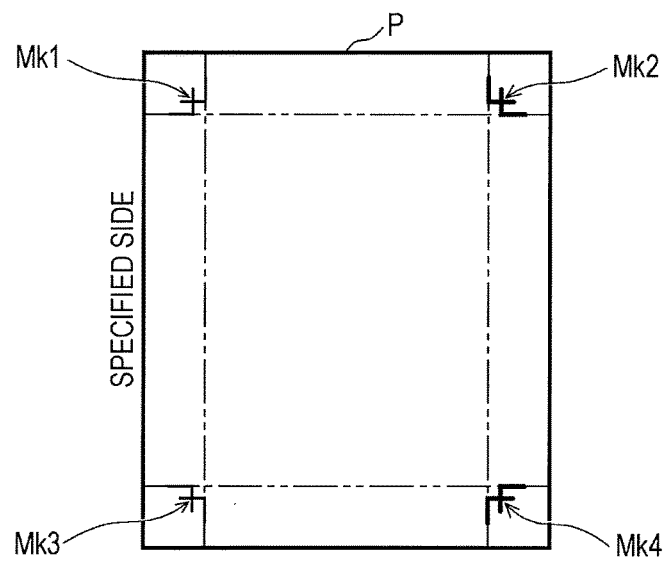
FIGS. 17A to 17C are diagrams illustrating states of a printed matter of an embodiment of the present invention.
Figure 17B:
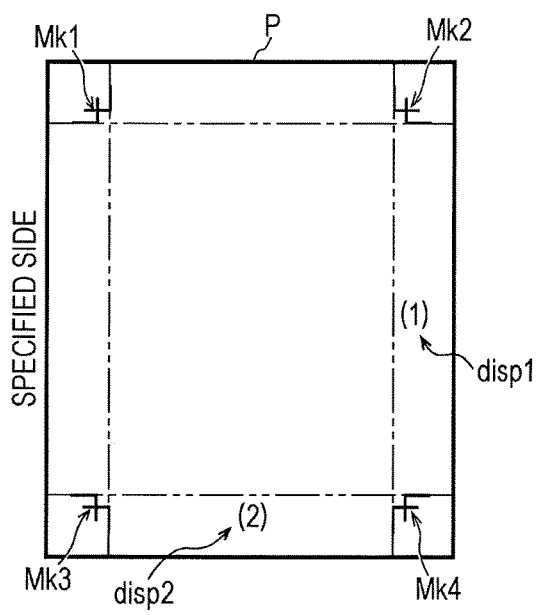
Figure 17C:
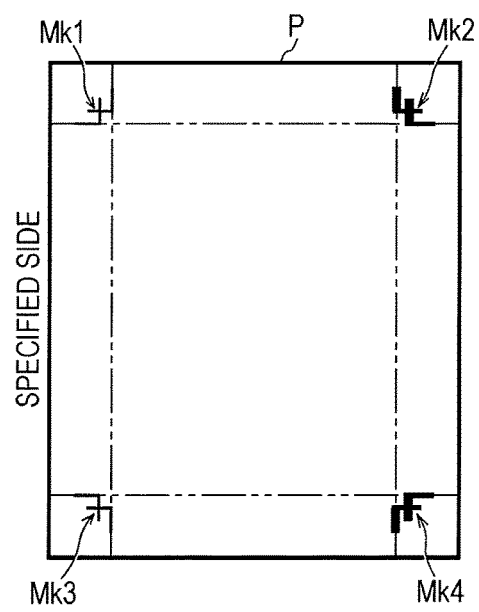

FIGS. 17A to 17C illustrate exemplary cases where the cutting marks Mk1 to Mk4 are attached when the image (not illustrated) is formed on the sheet P. The cutting mark is formed with a combination of two L-shaped marks, not a cross-shaped mark. By employing this shape, a sheet portion that remains after cutting does not come in contact in the cutting marks.

In FIG. 17A, an upper left-edge side in the figure is a specified side (reference position) that is defined as a correction target of skew correction. Cutting is executed at a position indicated by a one-dot chained line enclosed by the cutting marks Mk1 to Mk4. In this case, a one-dotted chained line at the right edge opposing the specified side (the cutting position sandwiched between the cutting marks Mk2 and Mk4) is a cutting position to be cut first. Accordingly, in order to make the cutting position clearly distinguished, the cutting marks Mk2 and Mk4 sandwiching the cutting position are formed in a line thicker than the other cutting marks Mk1 and Mk3. In this, other pattern than a thick line may be used as long as it is distinctive.

In FIG. 17B, an upper left-edge side in the figure is a specified side (reference position) that is defined as a correction target of skew correction. In this case, a one-dotted chained line at the right edge opposing the specified side (the side sandwiched between the cutting marks Mk2 and Mk4) is a first cutting position to be cut first. In order to clearly distinguish the first cutting position, a cutting order indication dsp1 ((1) in FIG. 17B) is displayed in a region that is in the vicinity of the side of the cutting position and that is scheduled to be cut away. In order to clearly distinguish a second cutting position that is in a second order, a cutting order indication dsp2 ((2) in FIG. 17B) is displayed in a region that is in the vicinity of the side of the cutting position and that is scheduled to be cut away.

In FIG. 17C, an upper left-edge side in the figure is a specified side (reference position) that is defined as a correction target of skew correction. In this case, a one-dotted chained line at the right edge opposing the specified side (the side sandwiched between the cutting marks Mk2 and Mk4) is a first cutting position to be cut first.

Accordingly, in order to make the cutting position (cutting position sandwiched between the cutting marks Mk2 and Mk4) clearly distinguished, the cutting marks Mk2 and Mk4 sandwiching the cutting position are configured such that portions parallel to the first cutting position are formed in thickest lines. Accordingly, in order to make the second cutting position (cutting position sandwiched between the cutting marks Mk3 and Mk4) clearly distinguished, the cutting marks Mk3 and Mk4 sandwiching the cutting position are configured such that portions parallel to the second cutting position are formed in second thickest lines. Lines for the cutting marks other than the above-described lines are formed in thin or medium-width line. In this manner, the cutting mark lines are formed in three-level thickness such that the first cutting position, the second cutting position, and the other cutting positions are clearly distinguished. In this, other patterns than thickness may be used as long as it is distinctive.

As described above, it would be possible to allow, regarding any of the cutting marks Mk1 to Mk4, a portion of the cutting mark to protrude to the outside the sheet in a range that distinction is possible as a cutting mark, in a case where skew priority is selected and a sufficient skew correction margin need to be obtained.

The above description includes a case where a cutting section (cutting device) has a structure of cutting a side opposing the side against which an abutting tool has been abutted. In the present embodiment, however, it would also allowable to use a cutting section configured to abut against the side to be cut. In this case, the mark is set so as to first cut a side of the specified side, instead of the side opposing the specified side. Moreover, in this case, Lcut is positioned on the side of the specified side in FIGS. 15E and 15F. In short, setting should be made depending on the relationship between the abutting side and the cutting side, on the cutting section. It is allowable to configure such that setting is preliminarily fixed to one of the setting, or that setting can be switched by the operation display unit 103.

[Other Embodiment (1)]

In FIG. 8A above, the print image matches the sheet size, and a predetermined amount on four sides of the sheet is designed to be blank image so as not to be printed. In this case, even when an image protrudes from the white-edge portion onto a drawing allowable area, this would not cause substantial image lacking. This white-edge size can be obtained and its corresponding amount can be used as a position adjustment margin, or it is possible to configure image processing such that a substantial white background is extracted from the image information and protruding from the drawing allowable area up to the range permitted.

[Other Embodiment (2)]

Embodiments of the image forming apparatus 100 can be changed as described below.

In an image forming system including the plurality of image forming apparatuses 100-1 to 100-n as illustrated in FIG. 3, the above-described control is performed by a control unit of each of the image forming apparatuses 100-1 to 100-n that has received the reading result by the image reading apparatus 200.

In an image forming system including the plurality of image forming apparatuses 100-1 to 100-n as illustrated in FIG. 4, the above-described control is performed by the image processing control apparatus 300 that has received the reading result by the image reading apparatus 200. Subsequently, the image processing control apparatus 300 issues notification of correction parameters to the image forming apparatus 100-1 to 100-n.

In addition, in an image forming system as illustrated in FIG. 4, it would be also desirable to calculate correction parameters so as to unify characteristics of the image forming apparatuses 100-1 to 100-n, and unify skew correction on/off settings.

[Other Embodiment (3)]

The above description includes a case where a cutting section has a structure of cutting a side opposing the side against which an abutting tool has been abutted. The configuration, however, is not limited to this case. It would also allowable to use a cutting section configured to abut against the side to be cut. In this case, the predetermined one side on which the mark is generated differs depending on a specification of the cutting section used for the work. Accordingly, it is allowable to configure such that setting is preliminarily fixed to one of the setting, or that setting can be switched by the operation display unit 103.

[Other Embodiment (4)]

While the present embodiment is effective regardless of the sheet size, it is particularly effective in the case of using a sheet with an irregular size, formed by suitably cutting a large sheet bought by the user because rectangularity of the sheet is not sufficiently maintained in many cases. In other words, while the above-described embodiments are effective for regular size sheet and irregular size sheet, it is particularly effective for the irregular size sheet. It is also effective in a case where a regular size sheet with a slight error or variation in its shape.

[Effects Achieved by Embodiments]

(1) As described in the above-described embodiments, in execution of skew correction in which an image is preliminarily deformed so as to cancel distortion generated on an image formed on a sheet, in a case where it is assumed that the amount of margin available for distortion correction is a first correction margin amount, and the amount of margin used to correct distortion other than skew correction, among distortion, is a second correction margin amount, a third correction margin amount is calculated by subtracting the second correction margin amount from the first correction margin amount, and image processing including skew correction is executed toward a first image formed on a first surface of the sheet and a second image formed on a second surface of the sheet such that the skew correction amount to be corrected by the skew correction falls within a range of the third correction margin amount. As a result, it is possible to appropriately execute necessary skew correction by effectively using the margin in a case where adjustment involving skew correction is performed corresponding to various types of distortion generated at image forming. While the present embodiment is effective regardless of the sheet size, it is particularly effective in the case of using a sheet with an irregular size, formed by suitably cutting a large sheet bought by the user because rectangularity of the sheet is not sufficiently maintained in many cases.

(2) In the above-described (1), image processing including skew correction is executed so as to adjust the image to an intermediate position of each of the first and second images. As a result, it is possible to appropriately execute necessary skew correction by effectively using each of front and back margins in a case where adjustment involving skew correction is performed corresponding to various types of distortion generated at image forming.

(3) In the above-described (1), image processing including skew correction is executed by performing position adjustment for at least one of the first image and the second image such that the third margin amount is maximized in a case where it is selectable whether skew correction takes priority over items other than the skew correction and where skew correction priority is selected. As a result, it is possible to appropriately execute necessary skew correction by effectively using, to the maximum, each of front and back margins in a case where adjustment involving skew correction is performed corresponding to various types of distortion generated at image forming.

(4) In the above-described (3), it is allowable that a portion of the mark indicating the cutting position of the sheet protrudes from the sheet when the mark is generated. As a result, it is possible to appropriately execute necessary skew correction by effectively using, to the maximum, each of front and back margins in a case where adjustment involving skew correction is performed corresponding to various types of distortion generated at image forming.

(5) In the above-described (1) to (4), a skew correction amount to be corrected by the skew correction is calculated, and the skew correction is not executed in a case where the skew correction amount is smaller than a predetermined threshold. As a result, this makes it possible to prevent image quality deterioration due to skew correction.

(6) In the above-described (5), a skew correction amount is calculated separately for a main scan direction correction amount and a sub scan direction correction amount, at image forming, and the skew correction is not executed in a case where each of the main scan direction correction amount and the sub scan direction correction amount is smaller than a predetermined threshold. As a result, this makes it possible to prevent image quality deterioration due to skew correction.

(7) In the above-described (5) to (6), a skew correction amount to be corrected by the skew correction is calculated, and the skew correction is executed in a condition where the skew correction amount is smaller than a predetermined threshold and in case where the selection was execution of the skew correction even when the condition is met. As a result, this makes it possible to prevent image quality deterioration due to skew correction and to select execution of skew correction in response to a request.

(8) In the above-described (5) to (6), a skew correction amount to be corrected by the skew correction is calculated, and skew correction is not executed in a condition where the skew correction amount is smaller than a predetermined threshold and in a case where the selection was non-execution of the skew correction when the condition is met. As a result, this makes it possible to prevent image quality deterioration due to skew correction in response to a request and to select execution of skew correction in response to a request.

Although the present invention has been described and illustrated in detail, it is clearly understood that the same is by way of illustrated and example only and is not to be taken by way of limitation, the scope of the present invention being interpreted by terms of the appended claims.

What is claimed is:

1. An image processing apparatus comprising:
an image processing unit configured to execute image processing including skew correction that deforms an image so as to cancel distortion generated on the image formed on a sheet; and
a control unit configured to control the image processing on the image processing unit,
wherein, in a case where a margin amount available for correcting the distortion is defined as a first correction margin amount and a margin amount used for correction other than skew correction, among the distortion, is defined as a second correction margin amount, the control unit calculates a third correction margin amount obtained by subtracting the second correction margin amount from the first correction margin amount, and
controls such that the image processing unit executes the image processing including the skew correction toward a first image formed on a first surface of the sheet and toward a second image formed on a second surface of the sheet such that the skew correction amount to be corrected by the skew correction falls within a range of the third correction margin amount.

2. The image processing apparatus according to claim 1, wherein the image processing unit executes the image processing including the skew correction so as to adjust the image to an intermediate position of the first image and the second image.

3. The image processing apparatus according to claim 1, wherein, in a case where it is selectable whether skew correction takes priority over items other than the skew correction and where skew correction priority is selected,
the control unit controls the image processing unit so as to execute the image processing including the skew correction by performing position adjustment for at least one of the first image and the second image such that the third margin amount is maximized.

4. The image processing apparatus according to claim 3, wherein the control unit allows a portion of a mark indicating a cutting position of the sheet to protrude from the sheet when the mark is generated.

5. The image processing apparatus according to claim 1, wherein the control unit calculates a skew correction amount to be corrected by the skew correction, and controls the image processing unit so as not to execute the skew correction in a case where the skew correction amount is smaller than a predetermined threshold.

6. The image processing apparatus according to claim 5, wherein the control unit calculates the skew correction amount separately for a main scan direction correction amount and a sub scan direction correction amount, at image forming, and controls the image processing unit so as not to execute the skew correction in a case where each of the main scan direction correction amount and the sub scan direction correction amount is smaller than a predetermined threshold.

7. The image processing apparatus according to claim 5, wherein the control unit calculates a skew correction amount to be corrected by the skew correction, and controls the image processing unit so as to execute the skew correction in a condition where the skew correction amount is smaller than a predetermined threshold and in a case where the selection was execution of the skew correction even when the condition is met.

8. The image processing apparatus according to claim 5, wherein the control unit calculates a skew correction amount to be corrected by the skew correction and controls the image processing unit so as not to execute the skew correction in a condition where the skew correction amount is smaller than a predetermined threshold and in a case where the selection is non-execution of the skew correction when the condition is met.

9. A non-transitory recording medium storing a computer readable program used in an image processing apparatus including:
an image processing unit configured to execute image processing including skew correction that deforms an image so as to cancel distortion generated on the image formed on a sheet; and
a control unit configured to control the image processing on the image processing unit,
wherein, in a case where a margin amount available for correcting the distortion is defined as a first correction margin amount and a margin amount used for correction other than for skew correction, among the distortion, is defined as a second correction margin amount, a third margin amount is calculated by subtracting the second correction margin amount from the first correction margin amount, and
the image processing unit executes the image processing including the skew correction toward a first image formed on a first surface of the sheet and toward a second image formed on a second surface of the sheet such that the skew correction amount to be corrected by the skew correction falls within a range of the third correction margin amount.

10. The non-transitory recording medium storing a computer readable program according to claim 9, wherein the image processing unit executes the image processing including the skew correction so as to adjust the image to an intermediate position of the first image and the second image.

11. The non-transitory recording medium storing a computer readable program according to claim 9, wherein, in a case where it is selectable whether the skew correction takes priority over items other than the skew correction and where priority of skew correction is selected, the control unit controls the image processing unit so as to execute the image processing including the skew correction by performing position adjustment for at least one of the first image and the second image such that the third margin amount is maximized.

12. The non-transitory recording medium storing a computer readable program according to claim 11, wherein the control unit allows a portion of a mark indicating a cutting position of the sheet to protrude from the sheet when the mark is generated.

13. The non-transitory recording medium storing a computer readable program according to claim 9, wherein the control unit calculates a skew correction amount to be corrected by the skew correction, and controls the image processing unit so as not to execute the skew correction in a case where the skew correction amount is smaller than a predetermined threshold.

14. The non-transitory recording medium storing a computer readable program according to claim 13, wherein the control unit calculates the skew correction amount separately for a main scan direction correction amount and a sub scan direction correction amount, at image forming, and controls the image processing unit so as not to execute the skew correction in a case where each of the main scan direction correction amount and the sub scan direction correction amount is smaller than a predetermined threshold.

15. The non-transitory recording medium storing a computer readable program according to claim 13, wherein the control unit calculates a skew correction amount to be corrected by the skew correction, and controls the image processing unit so as to execute the skew correction in a condition where the skew correction amount is smaller than a predetermined threshold and in a case where the selection is execution of the skew correction even when the condition is met.

16. The non-transitory recording medium storing a computer readable program according to claim 13, wherein the control unit calculates a skew correction amount to be corrected by the skew correction, and controls the image processing unit so as not to execute the skew correction in a condition where the skew correction amount is smaller than a predetermined threshold and in a case where selection is non-execution of the skew correction when the condition is met.

* * * * *